April 20, 1954 A. E. JOEL, JR 2,676,209

COIN-CONTROLLED TELEPHONE SYSTEM IN WHICH TARIFF RATES FOR TELEPHONE CALLS ARE AUDIBLY TRANSMITTED AUTOMATICALLY TO A CALLING SUBSCRIBER

Filed Sept. 1, 1949 12 Sheets-Sheet 1

INVENTOR
A. E. JOEL, JR.
BY A. F. Kane
ATTORNEY

INVENTOR
A. E. JOEL, JR.
BY G. F. Kane
ATTORNEY

INVENTOR
A. E. JOEL, JR.
BY
G. F. Kane
ATTORNEY

April 20, 1954 A. E. JOEL, JR 2,676,209

COIN-CONTROLLED TELEPHONE SYSTEM IN WHICH TARIFF RATES FOR TELEPHONE CALLS ARE AUDIBLY TRANSMITTED AUTOMATICALLY TO A CALLING SUBSCRIBER

Filed Sept. 1, 1949 12 Sheets-Sheet 4

INVENTOR
A. E. JOEL, JR
BY
G. F. Kane
ATTORNEY

April 20, 1954 A. E. JOEL, JR 2,676,209

COIN-CONTROLLED TELEPHONE SYSTEM IN WHICH TARIFF RATES FOR TELEPHONE CALLS ARE AUDIBLY TRANSMITTED AUTOMATICALLY TO A CALLING SUBSCRIBER

Filed Sept. 1, 1949 12 Sheets-Sheet 5

INVENTOR
A. E. JOEL, JR.
BY G. F. Kane
ATTORNEY

April 20, 1954 A. E. JOEL, JR 2,676,209

COIN-CONTROLLED TELEPHONE SYSTEM IN WHICH TARIFF RATES FOR TELEPHONE CALLS ARE AUDIBLY TRANSMITTED AUTOMATICALLY TO A CALLING SUBSCRIBER

Filed Sept. 1, 1949 12 Sheets-Sheet 6

INVENTOR
A. E. JOEL, JR.
BY G. F. Kane
ATTORNEY

INVENTOR
A. E. JOEL, JR.
BY G. F. Kane
ATTORNEY

COIN-CONTROLLED TELEPHONE SYSTEM IN WHICH TARIFF RATES FOR TELEPHONE CALLS ARE AUDIBLY TRANSMITTED AUTOMATICALLY TO A CALLING SUBSCRIBER

Filed Sept. 1, 1949 12 Sheets-Sheet 8

INVENTOR
A. E. JOEL, JR.
BY G. F. Kane
ATTORNEY

COIN-CONTROLLED TELEPHONE SYSTEM IN WHICH TARIFF RATES
FOR TELEPHONE CALLS ARE AUDIBLY TRANSMITTED
AUTOMATICALLY TO A CALLING SUBSCRIBER

Filed Sept. 1, 1949 12 Sheets-Sheet 9

INVENTOR
A. E. JOEL, JR.
BY
A. F. Kane
ATTORNEY

INVENTOR
A. E. JOEL, JR.
BY
G. F. Kane
ATTORNEY

April 20, 1954 A. E. JOEL, JR 2,676,209

COIN-CONTROLLED TELEPHONE SYSTEM IN WHICH TARIFF RATES FOR TELEPHONE CALLS ARE AUDIBLY TRANSMITTED AUTOMATICALLY TO A CALLING SUBSCRIBER

Filed Sept. 1, 1949 12 Sheets-Sheet 11

INVENTOR
A. E. JOEL, JR.
BY G. F. Kane
ATTORNEY

INVENTOR
A. E. JOEL, JR.
BY
A. F. Kane
ATTORNEY

Patented Apr. 20, 1954 2,676,209

UNITED STATES PATENT OFFICE 2,676,209

COIN-CONTROLLED TELEPHONE SYSTEM IN WHICH TARIFF RATES FOR TELEPHONE CALLS ARE AUDIBLY TRANSMITTED AUTOMATICALLY TO A CALLING SUBSCRIBER

Amos E. Joel, Jr., New York, N. Y., assignor to Bell Telephone Laboratories, Incorporated, New York, N. Y., a corporation of New York Application September 1, 1949, Serial No. 113,642

19 Claims. (Cl. 179—6.3)

This invention relates to telephone systems and more particularly to automatic telephone systems in which calls originating at dial stations equipped with coin boxes are charged against the calling party through the collection of deposited coins or tokens.

In C. E. Brooks et al. Patent 2,357,576 of September 5, 1944, there is disclosed a system of the general character defined above which embodies improvements over dial switching telephone systems of the usual type, and which serves to reduce to a minimum the services of an operator in supervising toll calls for the purpose of collecting and refunding coins or tokens deposited by the calling party in accordance with the tariff rates for initial and overtime periods of conversation on such calls. In the system of the aforenoted patent all short haul, low tariff calls from coin box lines are directed to a trunk outgoing to a tandem office, such trunks having separate appearances in the banks of district or office selectors and separate lamp and jack appearances at the "A" operator's switchboard for each tariff rate. On the initiation of a call from a coin box line the calling party first deposits a coin to enable the call to be started and after receiving the usual dial tone proceeds to dial the directory number of the wanted line. The office code and numerical digits of the line number thus dialed are registered in the sender of the calling office and in accordance with the office code digits registered, a district and, if required, an office selector are set to select an idle trunk extending to a tandem office. The office code determines over which one of its district selector or office selector appearances the tandem trunk will be seized, that is, the appearance which is allocated to the proper tariff rate for the desired connection.

At the tandem office, upon seizure of the trunk, a connection is established with an idle tandem sender, following which the sender of the originating office is signaled to transfer the office code and numerical digit registrations of the wanted line number to registers of the tandem sender. After the number has been completely transferred, the proper charge rate lamp corresponding to the appearance over which the trunk was seized is lighted at the "A" switchboard, and the "A" operator then plugs one of her cord circuits into the jack associated with the lighted lamp, whereupon the coin initially deposited is refunded and the lighted charge rate lamp is extinguished. The operator then requests the calling person to deposit coins in the amount indicated by the charge rate lamp which was lighted and after hearing the deposit of such coins, disconnects her cord circuit from the jack. When she disconnects her cord circuit from the jack the tandem sender is signaled to proceed to control the completion of the connection to the wanted line in accordance with the digit information registered therein.

When the called subscriber answers, the timing of the call is initiated and after 4½ minutes the deposited coins are collected. After 5 minutes the proper charge rate lamp is flashed to indicate to the operator that an overtime interval has been reached. The operator again plugs a cord circuit into the jack associated with the flashing lamp and directs the calling person to signal her when he is through talking. In most cases the subscriber will elect to terminate the conversation at once. If he does not elect to do so, however, the operator leaves the plug of the cord circuit in the trunk jack, writes a ticket and handles the call in the well-known manner. It is apparent that, while the services of the operator on calls of the type described are considerably reduced over those required of an operator under usual practice, such services are not entirely eliminated since the continued supervision of the operator is required during any of the overtime periods during which conversation is continued, and since it is necessary also for the operator to come in on the connection before it is completed to the desired destination in order to request the calling party to deposite coins in accordance with the tariff rate prescribed for the initial period of conversation.

It is the object of the present invention to substantially eliminate the need for operators on toll calls originated at coin box stations, and to otherwise improve coin controlled telephone communication systems to the extent that the acts heretofore performed by an operator on such toll calls in requesting for, collecting, and refunding coins or tokens are performed automatically.

In accordance with a feature of the invention this object is attained through the medium of apparatus which functions automatically to transmit to a calling party at a coin box station a predetermined pronouncement indicative of the tariff rate prescribed for the initial period of conversation on a toll connection initiated at the coin box station. More particularly, a plurality of message bearing devices, such as magnetic tape type telegraphones, are provided, each corresponding to a particular set of bank terminals in which a tanden trunk terminates, and each bearing a request pronouncement for the deposit of coins in the value of the tariff rate determined by its corresponding set of bank terminals over which the trunk is seized in response to the dialing of the telephone designation of a particular called line.

A further feature of the invention resides in the use of coin controlled signal generators at the coin box station which function to identify each coin deposited thereat by a distinctive combination of two frequencies, and of means selectively responsive to the frequencies generated incident to the deposit of the coins for registering such coin deposits. A related feature contemplates the use of cooperating selector switches and a coin adding and register circuit which function automatically to totalize the values of the coins deposited at a coin box station; to check the amount deposited for the initial period of conversation against the prescribed tariff rate for such period; and to control the completion of an initiated call only when the totalized value of the deposited coins corresponds with the prescribed tariff rate.

Another feature of the invention provides means under control of the totalizing selector switches which functions to transfer the initiated call to an operator in the event the calling party fails to deposit the amount of tariff indicated by the telegraphone pronouncement automatically transmitted to the calling station on a toll call originated thereat, and which functions also to automatically advise the connected operator of the prescribed tariff rate.

A still further feature provides means whereby, after the initial period of conversation has terminated, the calling subscriber is automatically requested to deposit additional coins for overtime service and whereby the value of such coins, if deposited, is registered and checked against the tariff rate prescribed for such overtime service.

Still another feature of the invention resides in a timing-out circuit which functions, a predetermined interval of time after a coin deposit has been requested and has not been made, to automatically bring in an operator on the connection.

These and other features of the invention will be readily understood from the following description when read with reference to the accompanying drawings, in which:

Fig. 1 shows, in the upper position thereof, a coin box line terminating in a panel type office, a line finder, district selector, office selector and sender of which are schematically illustrated; shows, in the lower portion thereof a coin box line terminating in an office of the well-known cross-bar type, the line switch district and office selector frames, sender link switch frame, sender and marker of which are indicated by suitably labeled boxes; shows, in the right portion thereof the selector switch appearances of the outgoing end of a trunk extending from the originating office to a tandem office; and shows schematically, at the extreme left, the coin operated signal generators associated with each of the coin box lines illustrated;

Figs. 2, 4 and 5 taken together show the outgoing end of a tandem trunk;

Figures 1, 12:
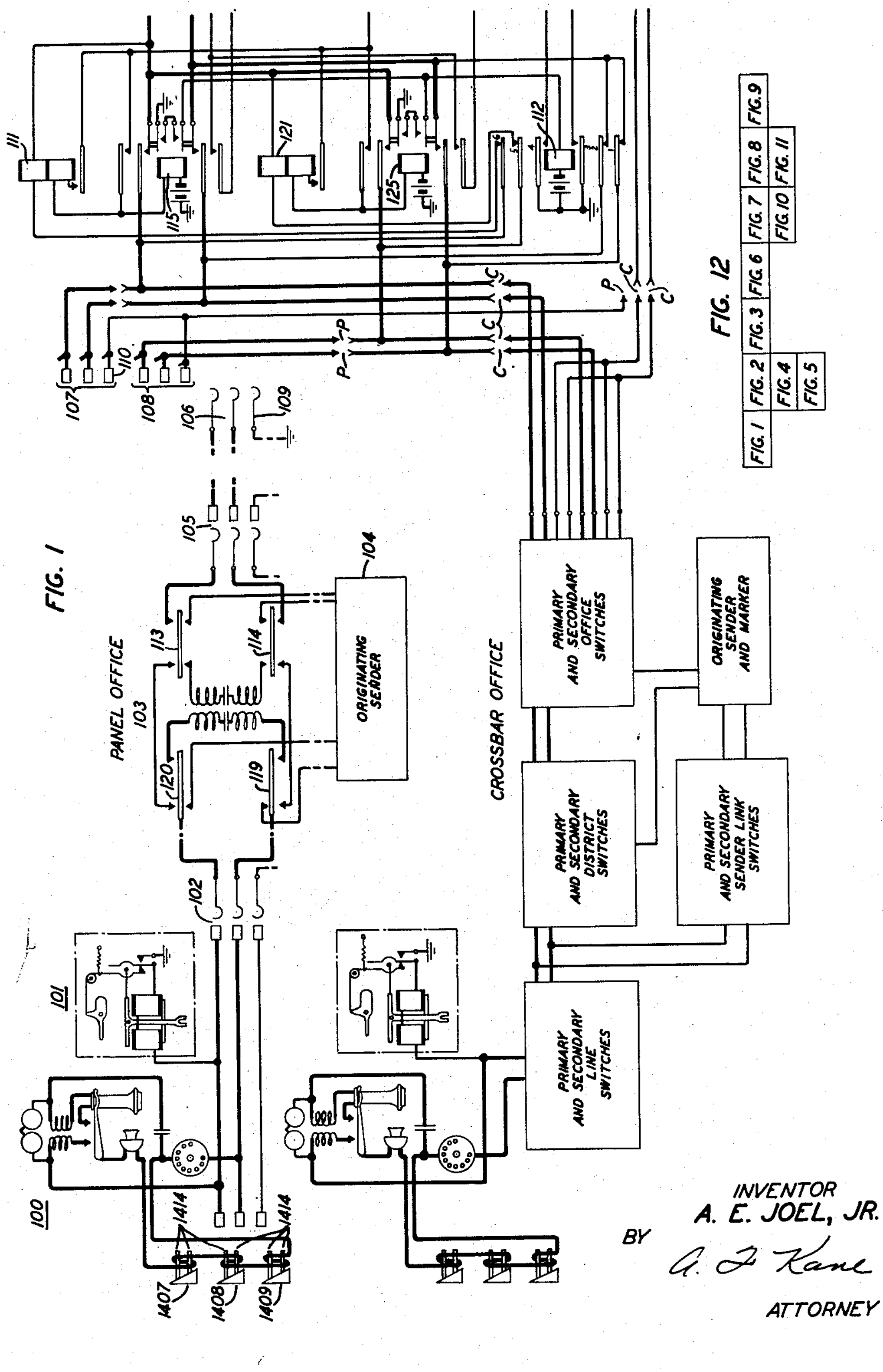
Figure 2:
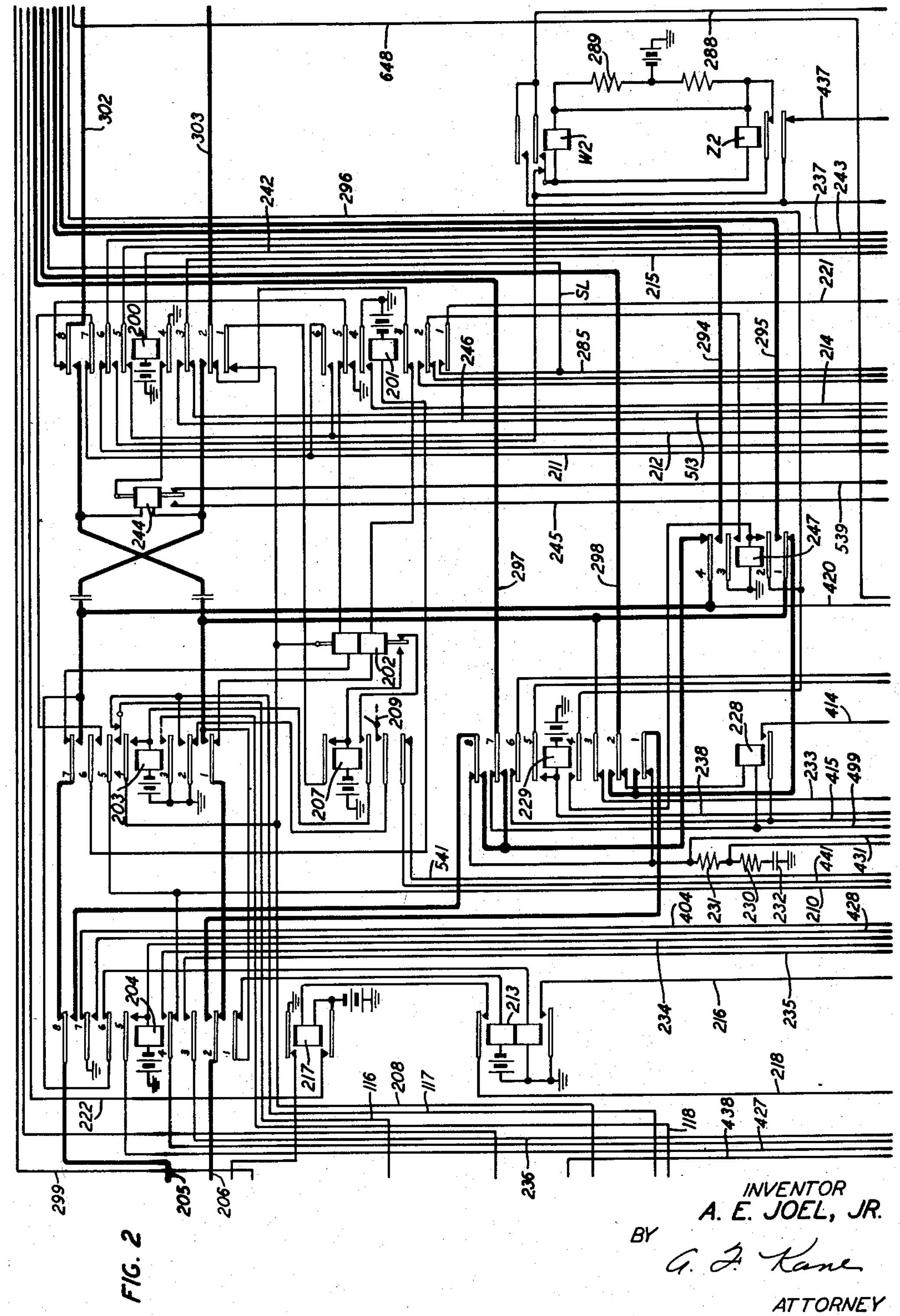
Figure 8:
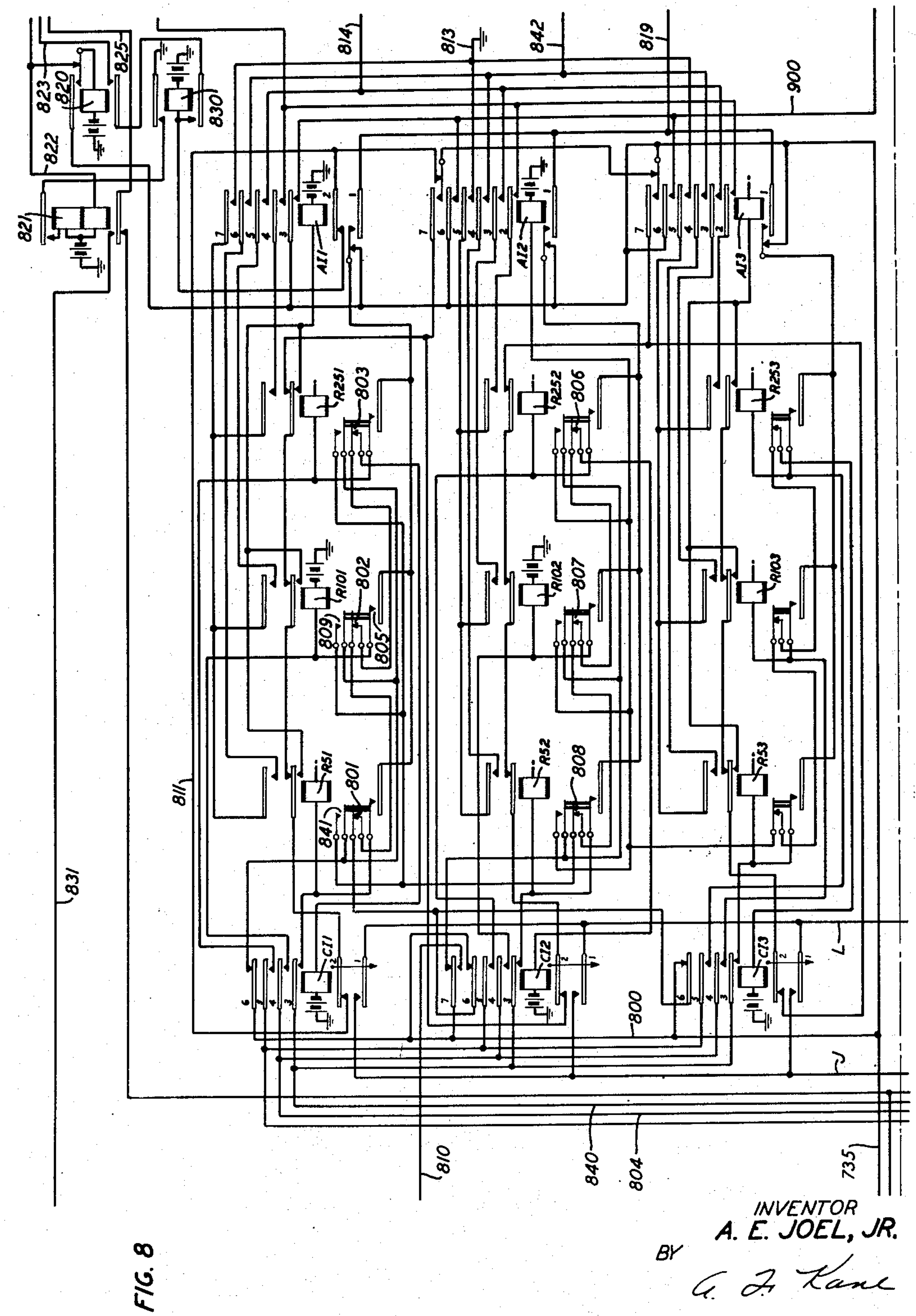
Figure 9:
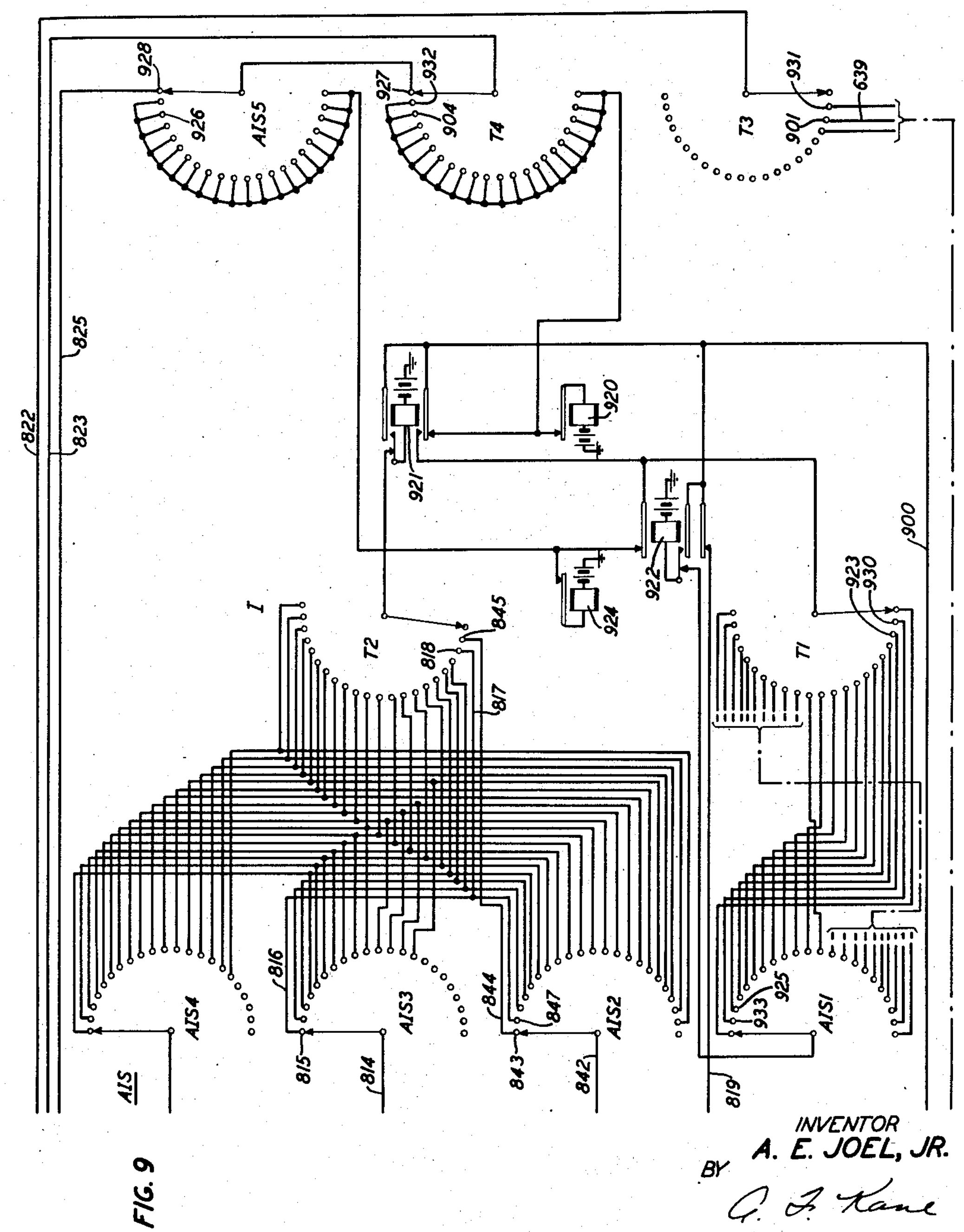
Figure 10:
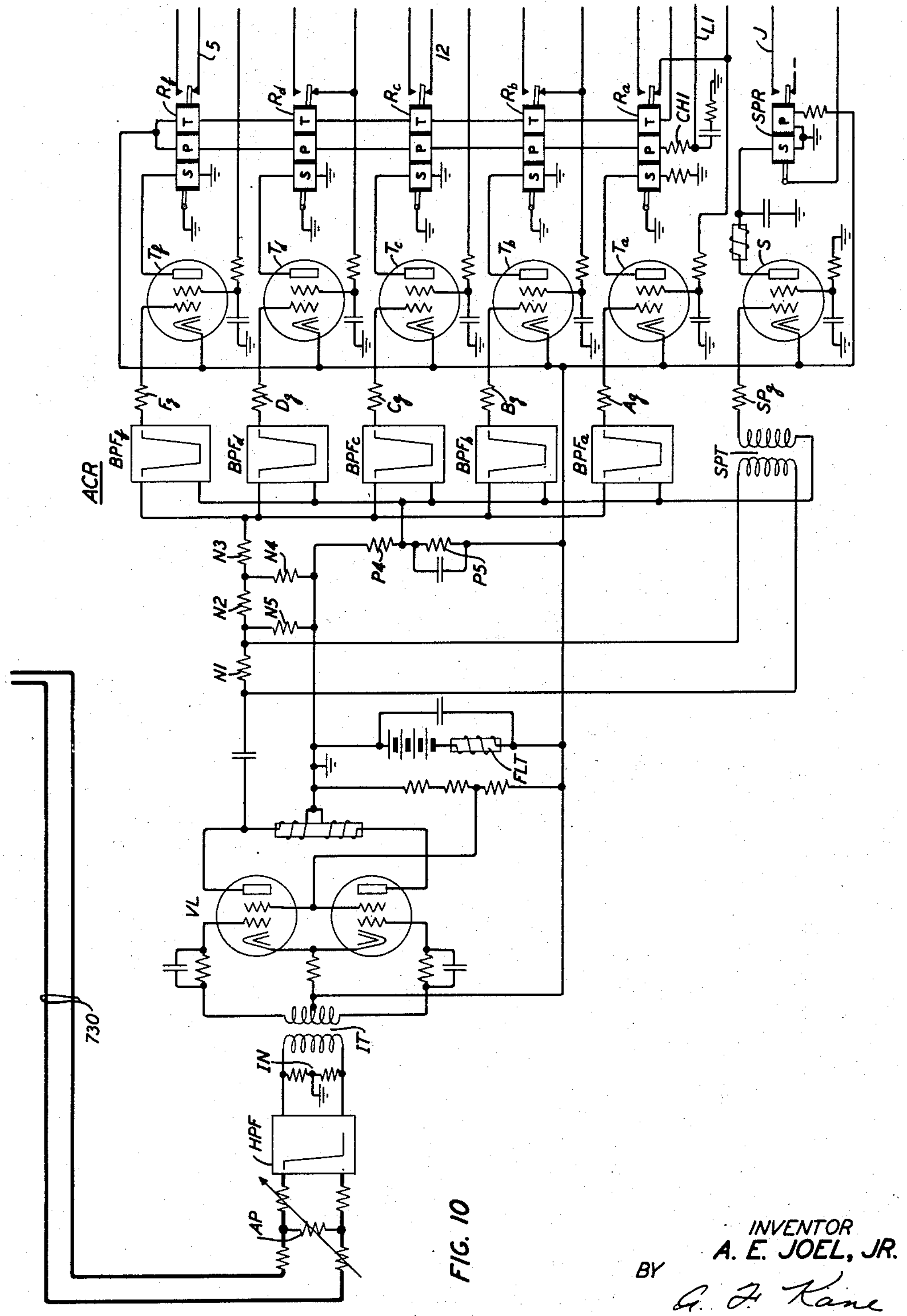
Figure 11:
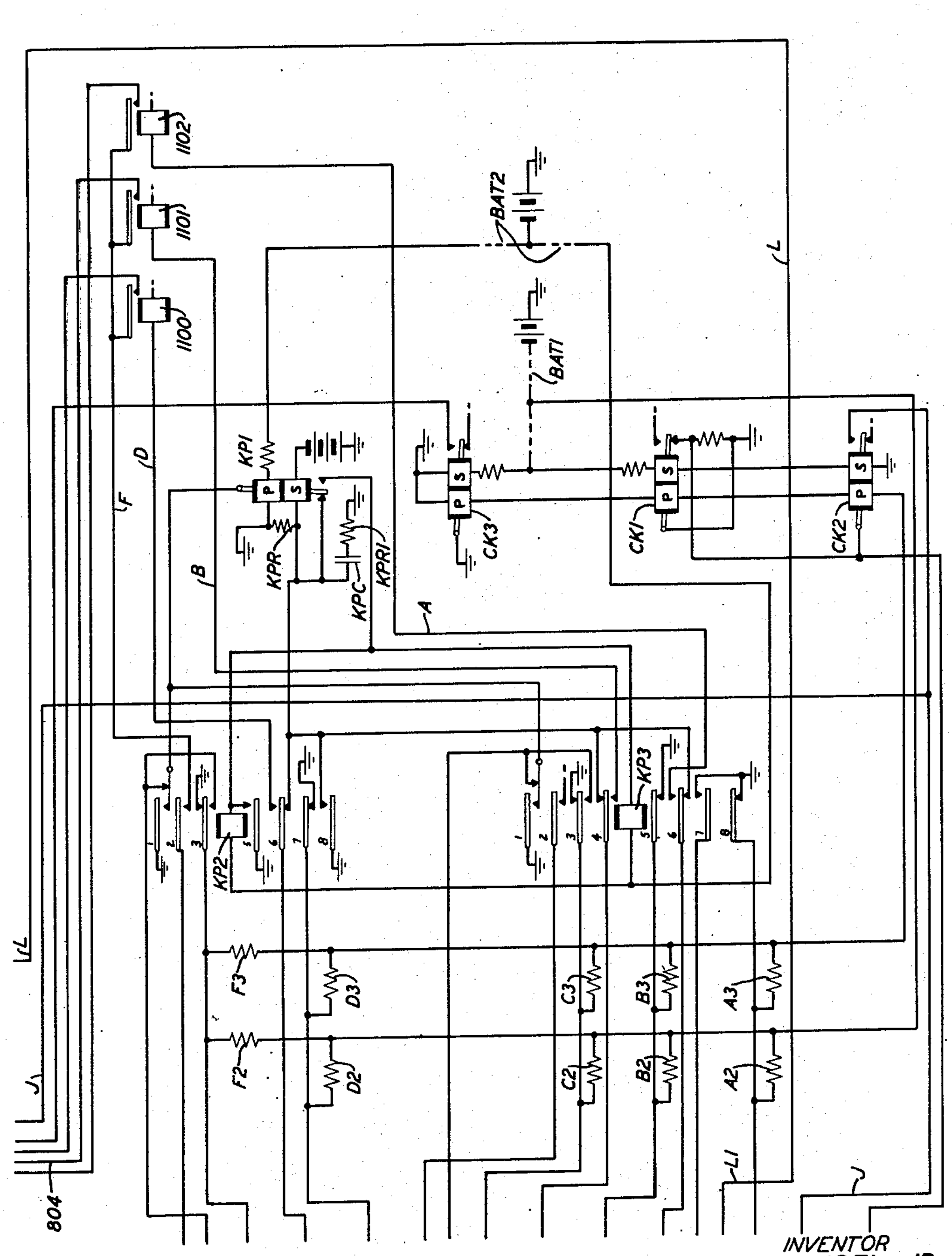
Figure 14:
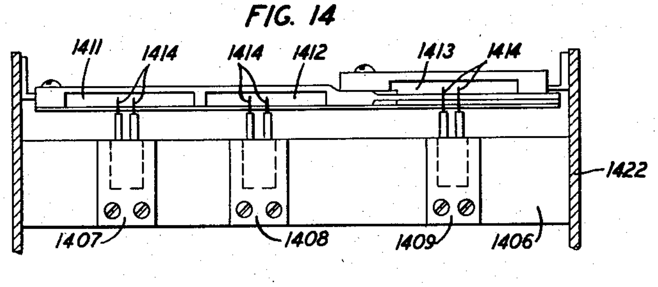
Figure 13:
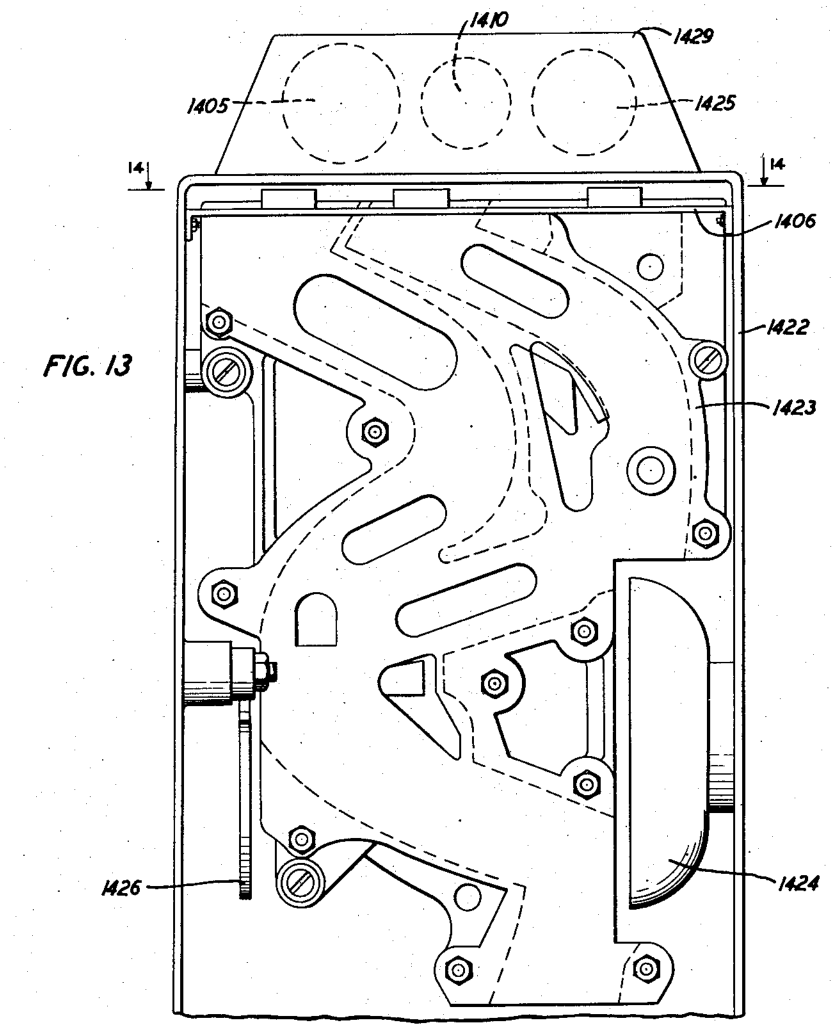

Fig. 8 shows diagrammatically a coin register and adding circuit which functions under control of an alternating-current signal receiver, Figs. 10 and 11, to recognize and register the deposit of nickels, dimes and quarters at a calling station and to condition the totalizing selectors, Fig. 9, accordingly, so as to enable them to totalize the values of the coins deposited at the calling station and to check such deposit against the tariff rate prescribed for initial and overtime periods of conversation on a call originated at a coin box station;

Fig. 9 illustrates diagrammatically the totalizing selectors which function to totalize the coins deposited at a calling station; to check the total against the prescribed tariff rates; and to direct the initiated call to a monitoring operator's position in the event the amount totalized does not check with the required tariff rates, or to permit the call to advance to completion when the value of the deposited coins checks with the prescribed tariff rates;

Figs. 10 and 11 constitute an alternating-current signal receiver which functions to detect the frequencies generated at the coin box station incident to the deposit of coins thereat and to transmit such information to the coin register and adding circuit of Fig. 8;

Fig. 12 is a chart showing how the several figures of the drawings should be arranged to illustrate a complete system embodying the invention; and Figs. 13 and 14 are partial views of a standard coin box modified to embody the coin controlled signal generators located at the coin box station.

Referring to the drawings, the apparatus of the originating panel type office X, disclosed schematically in the upper portion of Fig. 1, may be of the well-known type such as is disclosed, for example, in Patent No. 1,862,549, granted June 14, 1932, to R. Raymond and W. J. Scully, and the apparatus of the originating cross-bar type office Y, disclosed schematically in the lower portion of Fig. 1 may be of the well-known type such as is disclosed, for example, in Patent No. 2,093,117 granted September 14, 1937, to W. W. Carpenter. The interoffice tandem trunk may be used in common by a panel and a cross-bar office if they are in the same building, by strapping both the (p) and (c) cross-connections, but if such offices are not in the same building it is to be understood that a separate group of tandem trunks would extend from each office to the tandem office, and that a trunk when outgoing from the panel office would be connected by the cross-connections (p) to selector bank appearances in such office and when outgoing from the cross-bar office would be connected by the cross-connections (c) to cross-bar switch appearances in such office. The apparatus of the tandem office shown schematically in Fig. 3 may be of the general type disclosed in Patent No. 1,840,132 granted January 5, 1932, to T. H. Roberts, the tandem sender, however, being slightly modified as will be presently described. The interrupters 501, 502 and 503 of Fig. 5 form a part of a motor-driven timer 550 of the general type disclosed in Patent No. 2,112,375 granted March 28, 1938, to E. D. Mead. The interrupters are arranged to be clutched to the shaft of the driving motor by the operation of clutch magnet 504. Interrupters 505 to 511, inclusive, are miscellaneous power-driven interrupters on the interrupter frame of the originating office.

An alternating-current impulse receiving circuit ACR is disclosed in Figs. 10 and 11. This circuit is a substantial duplicate of the circuit shown in Patent No. 2,332,912 granted to G. Hecht, A. A. Lundstrom and E. R. Taylor on October 26, 1943. This receiver circuit will be described in sufficient detail in the present application to insure a clear understanding of its operation. The circuit is, however, described in a more comprehensive manner in the aforenoted Patent No. 2,332,912.

Figure 7:
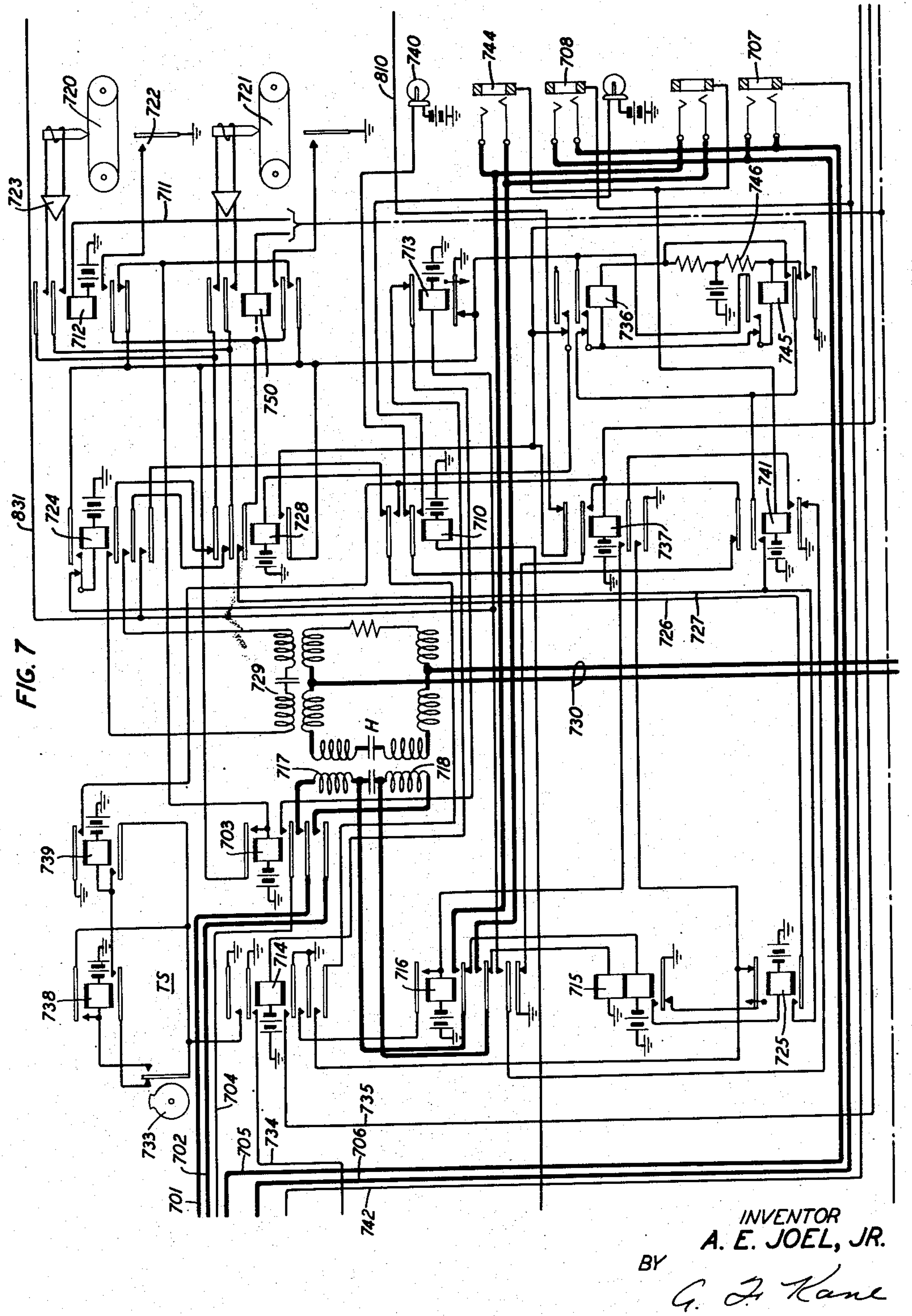
Fig. 7 illustrates diagrammatically the common coin controlled pronouncement circuit; a timing-out circuit; and a plurality of jacks located at a monitoring operator's position.

The equipment illustrated in Fig. 7 is located at the originating office. It consists principally of a plurality of magnetic tape-type telegraphones, two of which are illustrated diagrammatically at 720 and 721; a timing-out circuit TS, a hybrid coil H, and a plurality of jack terminations. The purpose and functioning of this apparatus will appear from the detailed description to follow. Suffice it to say at this time, that the operation of the equipment shown in Fig. 7 is initiated when any one of a group of relays, such as relay 712 is operated incident to the seizure of the tandem trunk by way of a corresponding set of bank terminals 107, 108. There are as many relays 712, 750, etc., as there are terminal appearances of the tandem trunk at the originating office. For each relay 712, 750, etc., and therefore, for each bank appearance 107, 108, etc., of the tandem trunk, there is one telegraphone such as 720, 721, etc. The telegraphone for each bank appearance carries a pronouncement which indicates the tariff rate prescribed for initial and overtime periods of conversation for a call originated at a coin box station and extended over the corresponding bank appearance of the tandem trunk. Through the medium of the hybrid coil H the pronouncement carried by the telegraphone selectively seized, incident to the initiation of a call at a coin box station, is transmitted to the calling station and, under particular circumstances which will be fully described hereinafter, to the monitoring operator's position. A single pronouncement device serves both the initial and overtime periods since, in the present system, it is assumed that the tariff rate in each case is the same. The request pronouncement may be given any suitable wording, for example, it may consist of the phrase "Please deposit ten cents for five minutes."

Figure 6:
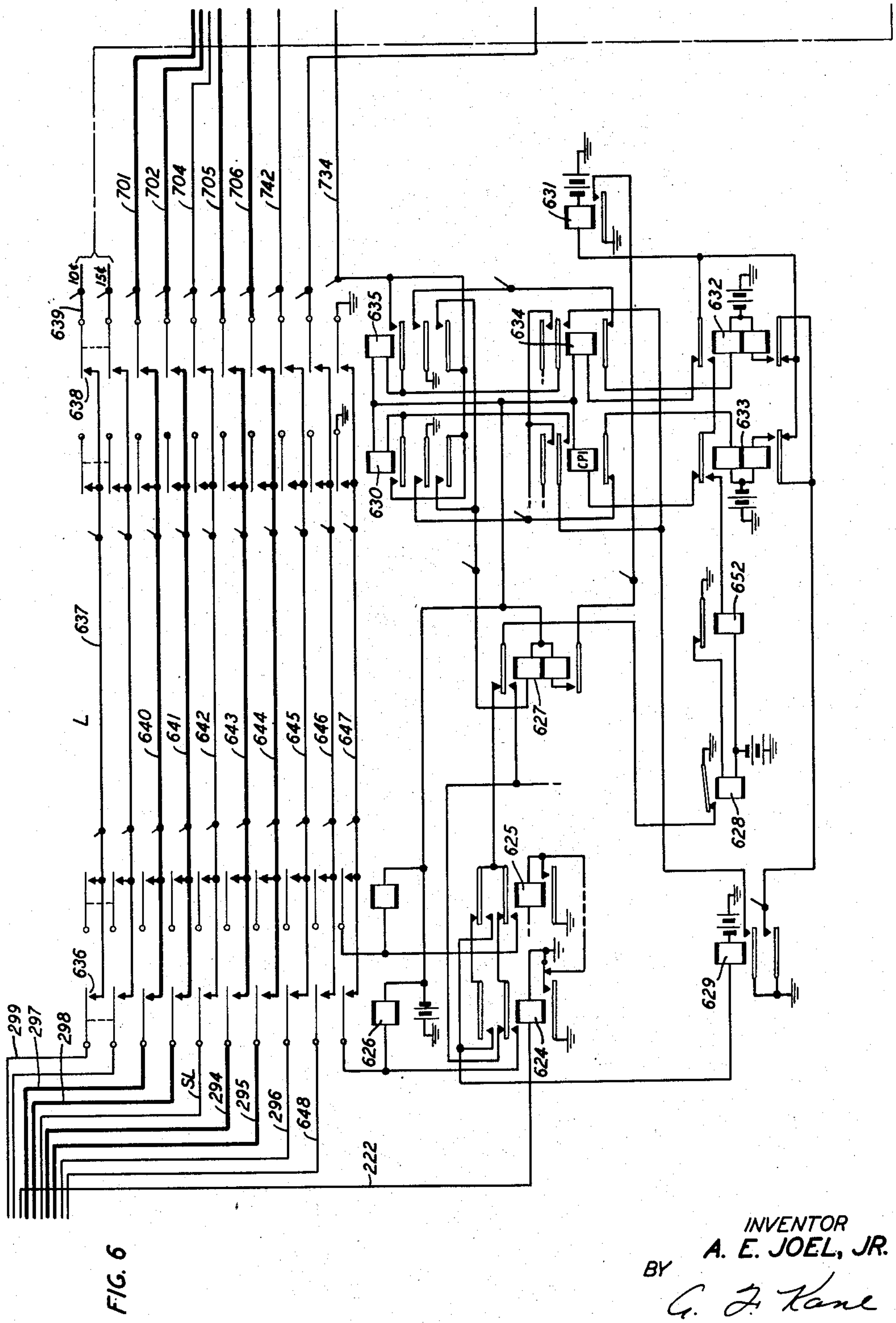
Fig. 6 illustrates diagrammatically, one of a number of link circuits to which the tandem trunks have access and which function, when seized, to extend a trunk to a common coin controlled pronouncement circuit.

The link circuit illustrated in Fig. 6 is common to a plurality of tandem trunks and functions incident to the operation of a trunk preference relay, such as relay 624 and the resulting operation of a corresponding trunk connector relay 626 and a coin control connector relay, such as relay 635, to extend the trunk to the pronouncement circuit, Fig. 7.

The coin register and adding circuit of Fig. 8, as illustrated, comprises three groups of register relays such as CI1, R51, R101, R251 and AI1, CI2, R52, R102, R252 and AI2, and CI3, R53, R103, R253 and AI3. The operation of a relay CI1, CI2 or CI3 determines which of the three registers is to function to register the first deposit of a coin and the circuit is so arranged that relay CI1 will operate to render the first register available to register the first coin deposit, relay CI2 will operate to render the second register available to register the second coin deposited, etc. The relays R51, R52 and R53 operate to recognize the deposit of nickels; relay R101, R102 and R103 to recognize the deposit of dimes; and relays R251, R252 and R253 to recognize the deposit of quarters. Relays AI1, AI2 and AI3 serve to transmit the information registered by the coin register and adding circuit to the totalizing selectors T and AIS of Fig. 9. Relays 820, 821 and 831 which appear at the upper right of Fig. 8 function to control the advance of the initiated call to its desired destination, or to a monitoring operator as conditions require.

The coin signals are generated at the coin box station through the medium of three sets of vibratable reeds located in such positions relative to the slots into which the various coins are deposited in the coin box that each coin, in its passage through its respective slot contacts a pair of reeds causing them to vibrate. Each pair of reeds, when actuated by a coin deposited by a calling subscriber, vibrates within a coil such as the coils diagrammatically illustrated at the left of Fig. 1. Each coil and its associated pair of reeds are supported within a suitable housing and the housings are mounted on a bracket in the coin box structure. As illustrated, the three generating coils are connected in series across the coin box line and, during the course of a connection involving the coin box line, are energized by current from the central office battery. Each pair of reeds has one reed tuned to vibrate at a frequency $f$ and the remaining reed of each set is tuned to vibrate at a different frequency $a$, $b$ or $d$. Thus, whenever a coin is deposited in the coin chute the corresponding reeds are vibrated to generate a double frequency current, one of the frequencies in each case being the frequency $f$.

In the instant application, the reed sets are designed so that the pair of reeds associated with the nickel chute will, when vibrated, generate frequencies $a$, $f$; the pair of reeds associated with the dime chute will, when vibrated, generate frequencies $b$, $f$; and the pair of reeds associated with the quarter chute will, when vibrated, generate frequencies $d$, $f$. These frequencies, as will appear from a later description, serve to selectively operate, through the alternating-current signal receiver ACR, Figs. 10 and 11, relays 1100, 1101 and 1102 which control the operation of the so-called nickel, dime and quarter relays of the coin register and adding circuit, Fig. 8.

The selector switches AIS and T of Fig. 9 which function to totalize and check the value of the coins deposited at a coin box station are of the well-known step-by-step selector switch type, each having its own stepping magnet. The switch AIS is provided with five terminal banks or arcs AIS1, AIS2, AIS3, AIS4 and AIS5 whereas the switch T is provided with four arcs T1, T2, T3 and T4.

The arc T3 of switch T is provided with a plurality of terminals to each one of which, except the first, is permanently connected a charge lead, or conductor, so that each such terminal corresponds to a particular tariff rate, the second terminal being allocated to a five-cent charge, the third to a ten-cent charge, the fourth to a fifteen-cent charge, and so on. Upon the initiation of a toll call at a coin box station a charge lead, such as 639 for example, is marked so as to mark a corresponding terminal of the arm T3 of switch T and to thereby inform the switches that an amount corresponding to the charge allocated to the particular marked terminal must be deposited by the calling subscriber.

The terminals of arc T1 of switch T are strapped to corresponding terminals of arc AIS1 of the switch AIS whereas the terminals of arc T2 of switch T are strapped to the terminals of arcs AIS2, AIS3 and AIS4 as illustrated. The brushes of arcs AIS2, AIS3 and AIS4 are cut through to the controls of the so-called nickel, dime and quarter relays, such as R51, R101 and R251, for example, whenever a relay AI1, AI2 or AI3 is operated so that if any of the said nickel, dime and quarter relays is operated, the first terminal of the corresponding arc of switch AIS is marked and such marking determines the number of steps to be taken by the selector switch T. It will be observed that the first terminal of arc AIS2, which is rendered operative when a so-called nickel relay, such as R51 for example, is operated, is connected to the first (off-normal) terminal of the arc T2 of switch T; that the first terminal of arc AIS3 of switch AIS corresponding to a so-called dime relay, such as R101 for example, is strapped to the second (off-normal) terminal of the arc T2 of switch T; and that the first terminal of arc AIS4 of switch AIS is strapped to the fifth (off-normal) terminal of arc T2 of switch T. Obviously, therefore, when the selector T is stepped around in search of a marked terminal on its arc T2, it will advance one step if the arc AIS2 of switch AIS is marked to indicate the deposit of a nickel; will advance two steps if the arc AIS3 of switch AIS is marked to indicate the deposit of a dime; and will advance five steps if the arc AIS4 of switch AIS is marked to indicate the deposit of a quarter. Thus, the selector T will advance one, two, or five steps depending upon whether the first, second or fifth terminal of its arc T2 is marked through the terminals of arcs AIS2, AIS3 or AIS4, respectively, of switch AIS, which terminals, in turn, are marked as a consequence of the operation of relay R51, R101 or R251, respectively, which occurs when a nickel, dime or quarter, respectively, is deposited at the coin box station. If the correct sum has been deposited by the calling subscriber, the switches AIS and T will operate in such a manner that the brush of arc T3 of switch T will come to rest upon the terminal thereof marked by a charge lead, such as conductor 639 for example, and the initiated call will be allowed to advance. If the brush of arc T comes to rest upon an unmarked terminal indicating a deposit of an incorrect amount of tariff by the calling subscriber the connection will be directed to a monitoring operator as will be described more fully hereinafter.

It will be observed also that the terminal strappings between arc T2 of switch T and of arcs AIS2, AIS3 and AIS4 of switch AIS are so arranged that it makes no difference what coins are used in payment for the toll charge so long as their total value corresponds to the tariff rate prescribed. For example, a toll charge of twenty-five cents may be paid with five nickels, with one nickel and two dimes, or with three nickels and one dime, and the switches AIS and T will function to check the total deposit against the prescribed tariff rate.

Arc T4 of switch T and arc AIS5 of switch AIS function to restore their respective switches to normal, and to thereafter transmit the signal which permits the initiated call to be advanced to completion, or the signal which routes the call to a monitoring operator.

*Initiation of call into ten-cent toll area*

It will be assumed that a person at the substation 100 of the coin box line which terminates in the panel type office X, desiring a toll connection, deposits a nickel in the nickel coin slot of the coin box apparatus schematically shown at 101 in Fig. 1, and in greater detail in Figs. 13 and 14, and upon removing the substation receiver from the switchhook, becomes connected by the line finder 102, over the line finder-district selector trunk 103 and the usual sender link circuit (not shown), with an idle sender 104 in the manner fully described in the Patent No. 1,862,549, hereinbefore referred to. When the calling line becomes connected with the sender the usual dial tone is transmitted from the sender to appraise the calling person that he may proceed to dial the digits of the desired line number. It will be assumed further that a number is dialed, the office code digits of which indicate that a ten-cent charge is required for the initial period of conversation. In accordance with the present invention, all toll calls to be terminated in the nearby toll area, such, for example, as calls involving ten-cent, fifteen-cent, etc., initial charges, are routed over special tandem trunks to a tandem office through which they are then completed. Therefore, in response to the registration of the office code digits indicative of the fact that the call is to be extended into a ten-cent zone of the exchange area, the sender 104 proceeds to control the setting of the district selector 105 and the office selector 106 to select an idle trunk extending to the tandem office. It will be assumed that the trunk disclosed in Figs. 1, 2, 3, 4 and 5 is idle and is seized therefore by the office selector 106 over the bank terminal set 107.

It will be noted that this trunk has two terminal bank appearances in the switch bank of office selector 106, one of which, 107, is allocated for seizure on all toll calls for which the initial charge rate is ten cents and the other of which, 108, is allocated for seizure on all toll calls for which the initial charge rate is fifteen cents. It is obvious that if it should be desired to enable connections to be established by dial control from coin box lines to subscribers' lines terminating in more remote offices of the exchange area, other appearances of the tandem trunk in banks of selector switches may be provided, allocated, for example, to calls for which the initial charge rate might be twenty cents, twenty-five cents, etc.

When the tandem trunk is seized, ground is applied over the sleeve brush 109 and sleeve terminal 110 of the trunk in well-known manner and thence to the sleeve terminal of all other bank appearances of the trunk and multiples thereof to mark the trunk busy. When all dialed digits have been registered in the sender 104, a circuit is established from battery through the right winding of relay 300 and over contacts of cam 301 in the incoming end of the tandem trunk of the tandem office, over trunk conductor 302, the No. 8 back contacts of relay 200, the No. 5 back contacts of relay 201, through the upper winding of polarized relay 202, the No. 7 back contacts of relay 203, the No. 8 back contacts of relay 204, conductor 205, through the upper winding of relay 111, the No. 6 back contacts of relay 112, over the tip bank terminal of terminal set 107, tip brushes of selectors 106 and 105, contacts of cam 113 at the district selector 105, thence through the windings of relays in the sender 104, returning over contacts of cam 114, ring brushes of selectors 105 and 106, ring bank terminal of terminal set 107, the No. 2 back contacts of relay 112, conductor 206, the No. 2 back contacts of relay 204, the No. 1 back contacts of relay 203, through the lower winding of polarized relay 202, the No. 3 back contacts of relay 201, the No. 2 back contacts of relay 200, trunk conductor 303, contacts of cam 304 to ground through the left winding of relay 300. Relays 111 and 300 operate in this circuit, relay 300 functioning to cause the association of a tandem sender with the incoming end of the tandem trunk, and relay 111, upon operating, establishing a locking circuit for itself extending from battery through the winding of relay 115, through the lower winding and contacts of relay 111, conductor 116, the No. 5 normal contacts of relay 203, conductor 117, sleeve terminal 110, brush 109 to ground in the office selector.

Relay 115 operates in this locking circuit, locks over its upper front contacts to ground on conductor 116; connects the trunk conductors 205 and 206 over its inner upper and lower contacts to the tip and ring terminals of the terminal set 107 independently of the contacts of relay 112; and establishes a circuit for relay 112 which may be traced from grounded battery through its winding, over the auxiliary inner front contacts of relay 115 to ground. Relay 112 upon operating, at its lower back contacts, disconnects the multiples of all unused appearances of the trunk. These operations take place while the circuits at the tandem office are recognizing the closure, advancing the trunk and link circuits and selecting an idle sender.

Figure 3:
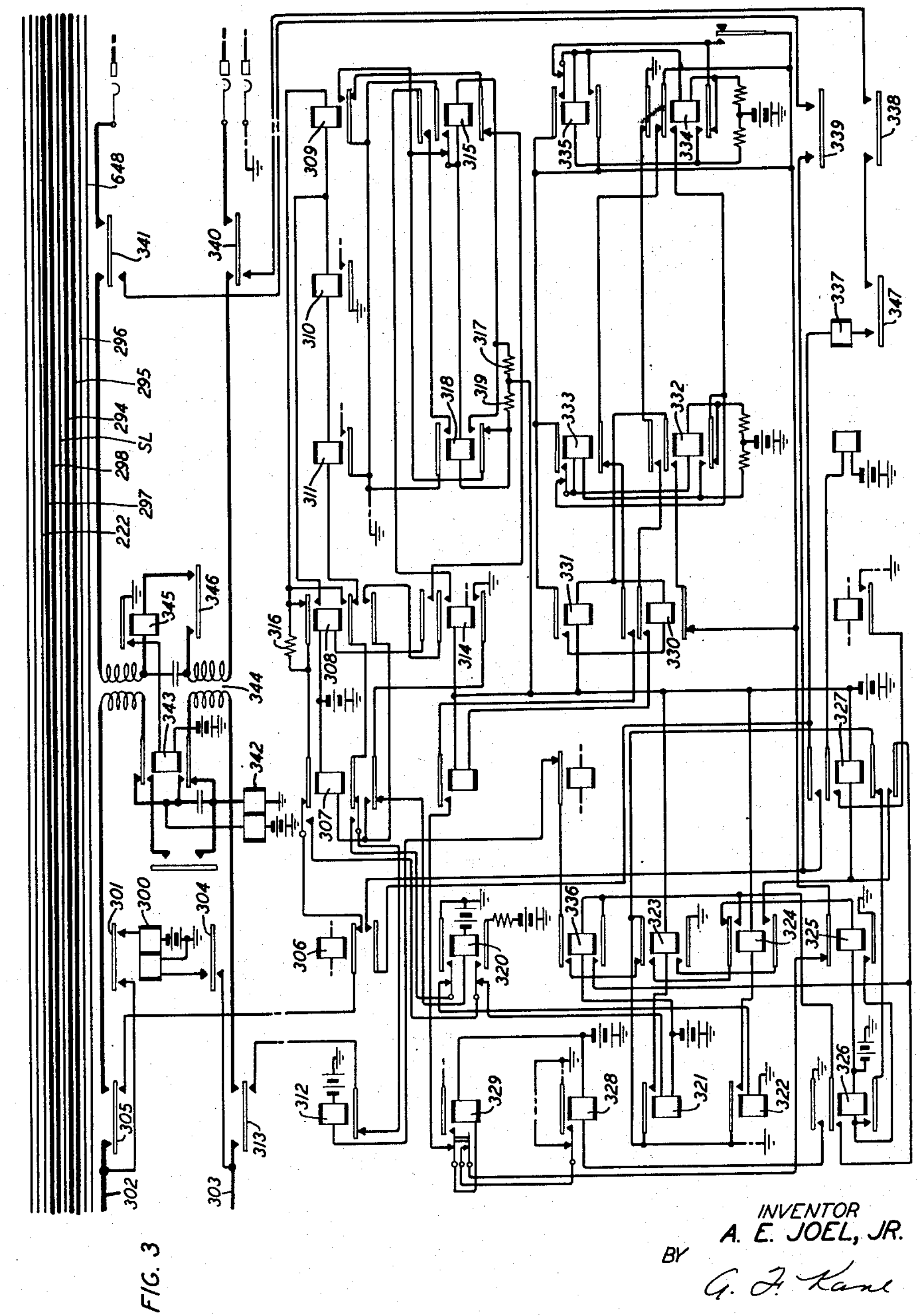
Fig. 3 shows, in the upper portion thereof, the tandem office end of the tandem trunk terminating in a tandem district selector, and, in the lower portion thereof, such portions of a tandem sender associable with the trunk as are necessary to an understanding of the invention.
Figure 4:
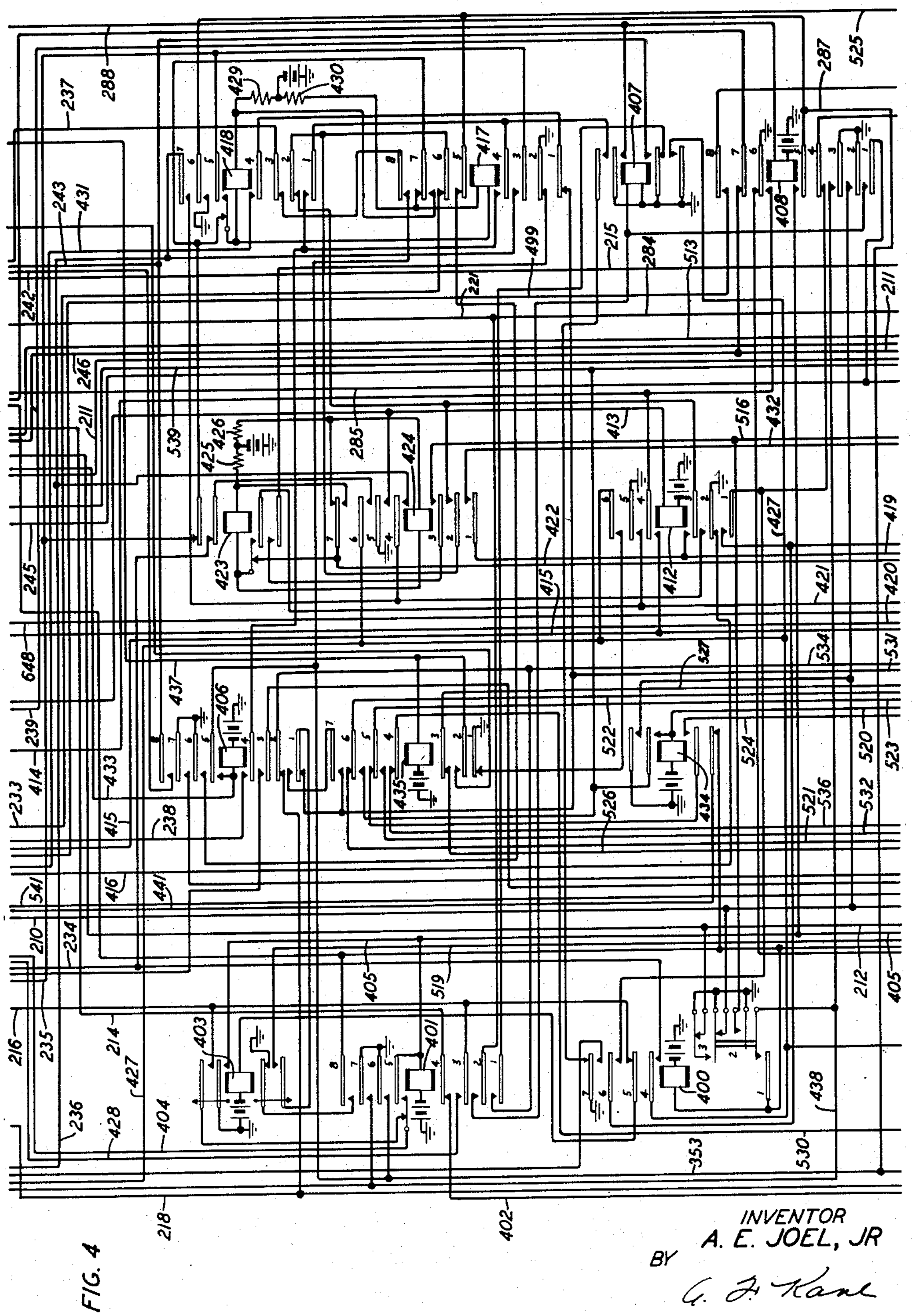

Upon the seizure of the tandem sender, a pulse receiving circuit is established between the original sender and the tandem sender, schematically disclosed in the lower portion of Fig. 3, which extends, as previously traced, from the sender 104 to trunk conductor 302, thence over contacts of cam 305, back contacts of relay 306, upper normal contacts of relay 307, upper back contacts of relay 308, serially through the windings of impulse responsive relays 309, 310 and 311, lower back contacts of relay 308, inner lower normal contacts of relay 307, contacts of relay 312, contacts of cam 313, trunk conductor 303 and thence as traced to the originating sender 104. In response to the closure of this circuit the originating sender proceeds to transmit codes of impulses for the purpose of transferring the called line designation digits from its registers to registers of the tandem sender. At the end of the last code impulse transmitted for the units digit series, with relay 314 operated, relay 308 operates in a circuit from battery through its winding, over the upper contacts of relay 314, the lower back contacts of relay 315, the back contacts of relay 309 to ground. With relay 308 operated, the impulse receiving circuit is prepared for the reception of the final positive impulse transmitted from the sender 104 which circuit extends, as previously traced, over the upper normal contacts of relay 307, thence over the upper front contacts of relay 308, through the winding of the negatively polarized impulse responsive relay 309, over the inner lower front contacts of relay 308 and thence, as previously traced, to the originating sender. Relay 308 at its upper back contacts removes the shunt from resistance 316 and bridges this resistance across the impulse receiving circuit in parallel with the winding of relay 309. The winding of relay 309 is now connected reversely into the impulse receiving circuit whereby it is responsive to the receipt of the final heavy positive impulse and establishes a circuit from ground over its front contacts, over the upper normal contacts of relay 315, through the winding of relay 315 and resistance 317 to battery. Relay 315 upon operating, locks over its inner upper alternate contacts to ground and prepares a circuit for relay 318. Upon the termination of the final heavy positive impulse when relay 309 releases, relay 318 energizes in a circuit from battery through resistance 319, the winding of relay 318, the inner upper alternate contacts of relay 315 to ground. With relays 315 and 318 now both operated, a circuit is established for transfer relay 307 extending from grounded battery through its winding, over the lower front contacts of relay 308, the inner upper front contacts of relay 314, the upper front contacts of relays 315 and 318 to ground. With relay 307 operated, the circuit previously established by the operation of relay 314 for relay 320 is opened at the lower back contacts of relay 307; relay 307 is locked over its lower front contacts to ground at the lower front contacts of relay 314; and the circuit extending back to the originating sender is transferred from the winding of relay 309 to the windings of relays 321 and 322, trunk conductor 302 being now extended over the contacts of cam 305, the back contacts of relay 306, the upper alternate contacts of relay 307, over the lower normal contacts of relay 320, to battery through the winding of relay 321, and trunk conductor 303 being now extended over contacts of cam 313, the back contacts of relay 312, the inner lower alternate contacts of relay 307, the upper normal contacts of relay 320, to ground through the winding of relay 322.

At the outgoing end of the tandem trunk, polarized relay 202 operated its armature against its left contact in response to the final heavy positive impulse, in turn causing the operation of relay 207 in a circuit from battery through its winding and the left contacts of relay 202, conductor 208, to ground at the No. 3 contacts of relay 112. Relay 207 upon operating locks in a circuit from battery through its winding, over its upper front contacts and the No. 1 back contacts of relay 200, to ground on conductor 208. At the end of the heavy positive impulse polarized relay 202 operates its armature against its right contact thereby opening the operating circuit of relay 207 and, with relay 207 locked operated, establishes a circuit from battery through the winding of relay 203, over the inner lower front contacts of relay 207 and the right contacts of relay 202 to ground on conductor 208. Relay 207 also connects ground on the No. 2 back contacts of relay 203 and its lower front contacts to peg count register conductor 209, and at its back contacts opens the timed release circuit. Relay 203 upon operating, locks over its No. 4 contacts to ground on conductor 208; opens the peg count register circuit at its No. 2 back contacts; at its No. 5 alternate contacts establishes a new holding circuit for relay 115 extending from conductor 116 over such contacts and conductor 210 to ground over the No. 3 back contacts of relay 400; establishes an operating circuit for relay 201 extending from battery through its winding, over the No. 6 contacts of relay 203, the No. 7 back contacts of relay 200, conductor 211, the inner upper back contacts of relay 500, conductor 212 to ground over the inner lower normal contacts of relay 400; connects ground over its No. 2 front contacts and conductor 117 to the sleeve terminals of the trunk in office selectors of the panel office; connects ground over its No. 3 contacts and conductor 118 to sleeve terminals of the trunk in the office switches of the cross-bar office in cases where the trunk is allocated to a cross-bar office; at its Nos. 1 and 7 back contacts opens the circuit previously traced through the windings of polarized relay 202; extends trunk conductor 205 over the No. 8 back contacts of relay 204, the No. 7 front contacts of relay 203, the No. 6 back contacts of relay 204, to ground through the lower winding of relay 213; and extends trunk conductor 206 over the No. 2 back contacts of relay 204, the No. 1 front contacts of relay 203, and the No. 1 back contacts of relay 204 to battery through the upper winding of relay 213. Relay 201, upon operating, disconnects the windings of polarized relay 202 from the trunk conductors 302 and 303 at its Nos. 3 and 5 back contacts, bridges, at its No. 6 contacts, the contacts of relay 500 included in its operating circuit; at its No. 5 front contacts connects ground over the No. 8 back contacts of relay 200 and thence over the circuit traced to battery through the winding of relay 321 at the tandem sender, thereby causing the operation of relay 321 followed by the operation of relay 323, and connects ground over its No. 4 contacts, conductor 214, the No. 4 back contacts of relay 401, conductor 402, to the armature of interrupter 507, which upon making its left contact completes the circuit of relay 512 over conductor 513, the No. 3 back contacts of relay 200, conductor 215 to battery through the winding of relay 512. Relay 512 operates in this circuit to start a timing cycle to be later described.

The operation of relay 323 at the tandem sender signals the sender that timing thereat must be suspended since there will be some delay before the calling subscriber is advised of the amount of toll to be deposited in the coin box and until the amount deposited is checked automatically. Relay 323 closes a circuit from ground over its upper front contacts and the upper back contacts of relay 324 to battery through the winding of relay 325. Relay 325 upon operating, causes the operation of relay 326 over an obvious circuit, which relay locks under the control of relay 327 over its lower front contacts and the back contacts of relay 327, and at its upper front contacts closes an obvious circuit for relay 328. With relay 328 operated or unoperated, ground is connected over its contacts, the lower normal contacts of relay 329 and the back contacts of relay 325 to the back contacts of timing relay 330 to start the operation of timing relays 330 to 335 to time-out the tandem sender, but since relay 325 has been operated, this timing start circuit is not effective and the timing-out of the sender is therefore delayed.

When the originating sender has completed the transmission of the final heavy positive impulse, it advances the sequence switch of the district selector 105 into the trunk closure position and the originating sender then becomes disconnected from the line finder-district selector trunk 103 and is restored to normal. Relay 213 now operates in a circuit which may be traced from battery through its upper winding, the No. 1 back contacts of relay 204, the No. 1 front contacts of relay 203, the No. 2 back contacts of relay 204, conductor 206, the middle lower front contacts of relay 115, ring terminals and brushes of selectors 106 and 105, contacts of cams 114 and 119, ring brush and terminal of the line finder 102, thence over the calling line loop, over the tip terminal and brush of the line finder 102, contacts of cams 120 and 113, tip brushes and terminals of selectors 105 and 106, middle upper front contacts of relay 115, conductor 205, the No. 8 back contacts of relay 204, the No. 7 front contacts of relay 203, the No. 6 back contacts of relay 204, to ground through the lower winding of relay 213. Relay 213 upon operating over this circuit establishes a circuit from ground over its lower contacts, conductor 216, the No. 5 back contacts of relay 400 to battery through the winding of slow-to-release relay 403, and at its upper contacts prepares the circuit of relay 217. Relay 403 upon operating, locks in a circuit extending from battery through its winding, over the No. 5 back contacts of relay 400, the outer upper front contacts of relay 403, the No. 5 normal contacts of relay 401, conductor 404, to ground at the No. 7 back contacts of relay 204 and, at its inner upper front contacts, connects ground to conductor 405 and through the winding of relay 401 to battery. Relay 401 now operates, locking over its No. 5 alternate contacts and conductor 404 to ground at the No. 7 back contacts of relay 204; opens, at its No. 5 normal contacts the locking circuit for relay 403 just traced; completes the operating circuit of relay 217 which may be traced from battery through its winding, over the upper contacts of relay 213, conductor 218, the No. 2 back contacts of relay 406, the No. 1 front contacts of relay 401, to ground at the back contacts of relay 407; opens at its No. 4 back contacts the previously traced circuit for relay 512 which relay thereupon releases, and at its No. 2 contacts connects the sleeve lead SL over the No. 1 contacts of relay 201, conductor 221, the No. 2 contacts of relay 401 to ground through the winding of relay 407.

*Seizure of request pronouncement circuit*

Relay 217 upon operating, with relay 115 operated to indicate a ten-cent toll call, establishes a circuit for trunk preference relay 624 (Fig. 6) which may be traced from battery over the lower contacts of relay 217, conductor 222, winding of relay 624 to ground.

Trunk connector relay 626 now operates in a circuit extending from grounded battery, through the winding of relay 626, inner upper front contacts of preferance relay 624, through the back contacts and first upper armatures of all trunk preference relays, such as relay 625, back contacts of relay 627, to ground by way of the front contact and armature of normally energized slow-to-release relay 628. Relay 628 is operated in an obvious circuit. Relay 629 operates in parallel with the operated relay 626, its operating circuit including the upper front contacts of relay 624 and the associated upper back contacts of all other trunk preference relays such as relay 625, the back contacts of relay 627 and the front contacts of relay 628.

It will be observed that each trunk has access to a particular link (Fig. 6) by way of a trunk connector relay, such as relay 626, and each link circuit has access to all coin control circuits (Fig. 7) through a particular, so-called coin control connector relay such, for example, as relay 635.

With relay 629 operated incident to the operation of relay 624, relay 631 operates in a circuit extending from grounded battery, winding of relay 631, back contacts and lower armatures of either or both relays 632 and 633, to ground at the lower front contacts of relay 629.

Ground at the lower contacts of relay 629 is also extended over the upper back contact of relay 632, thence through the winding of relay 634, to grounded battery, causing relay 634 to operate. With relay 634 operated, relay 635 operates in a circuit extending from grounded battery, winding of relay 635, inner upper armature and front contact of relay 634 to ground at the inner front contacts of relay 629.

With relays 626 and 635 operated as described, the link L is interposed between the coin controlled pronouncement circuit (Fig. 7) and the leads extending from the trunk. When relay 624 operated, it locked to battery at the lower front contacts of relay 217 by way of conductor 222 and its own lower front contacts. Relay 635 at its innermost upper front contacts provides locking ground for relay 626 and at its middle lower armature locks itself to ground on conductor 734, which conductor is grounded when relay 714 operates, as will be described presently.

It will now be observed that with relay 217 operated and the trunk extended to the coin controlled pronouncement equipment by way of the link L, ground at the upper contacts of relay 217 is extended by way of the outer lower front contacts of relay 115 (which relay identifies a toll call requiring an initial charge of ten cents) to conductor 299, contact 636 of trunk connector relay 626, conductor 637 of link L, contact 638 of coin control connector relay 635, charge lead 639 which extends across the bottom of Figs. 7, 8 and 9 and terminates in contact 901 of the arc T3 of selector switch T, which switch also includes the terminal arcs T1, T2 and T4. Thus, in response to the seizure of the tandem trunk by way of the terminal appearance 107, which is allocated to calls whose initial toll charge is ten cents, the terminal 901 of arc T3 of the switch T is marked with ground potential from relay 217 by way of the charge lead 639.

The leads 640 and 641 of the link L extend the trunk leads 297 and 298 from the Nos. 7 and 2 armatures of relay 229 to corresponding conductors 701 and 702 which terminate at the middle and outermost lower armatures of relay 703 associated with the pronouncement circuit.

The link lead 642 extends the sleeve conductor SL which, as hereinbefore described is extended to the winding of relay 407 by way of the No. 1 contacts of relay 201, conductor 221, and the No. 2 contacts of relay 401, to the corresponding lead 704.

The link leads 643 and 644 extend the trunk leads 294 and 295 from upper and lower front contacts of relay 247 to the tip and ring terminals of jacks 707 and 708 in multiple. The link lead 645 connects the sleeves of jacks 707 and 708 to the lead 296 which is connected to the Nos. 2 and 4 armatures of relays 247 and 229 respectively.

The link lead 646 extends the operating winding of relay 710 to the conductor 648 which terminates at the lower front contact of overtime relay 590. The link conductor 647 provides locking ground for the operated trunk connector relay 626.

*Initial response of request pronouncement circuit*

It will be observed that the ground which is connected to the lead 299 by virtue of the operation of both relays 115 and 217 and extended to the terminal 901 of arc T3 of the switch T by way of charge lead 639, is also extended to battery through the winding of relay 712 by way of conductor 711. Relay 712 accordingly operates in this circuit. At its lower front contacts relay 712 completes an obvious operating circuit for relay 703 which finds ground at the lower back contacts of relay 713.

Relay 703, in operating, locks under control of relay 713. At its middle and outermost lower armatures, relay 703 extends the trunk conductors 701 and 702 to the output side of hybrid coil H. At its innermost lower armature and front contacts, relay 703 completes the following circuit: from battery, winding of relay 714, upper back contacts and armature of relay 713, front contacts and innermost lower armature of relay 703, conductor 704, corresponding front contacts of relay 635, link conductor 642 and corresponding front contacts of relay 626, sleeve conductor SL, No. 1 contacts of relay 201, conductor 221, No. 2 contacts of relay 401, to ground through the winding of relay 407.

Relay 714 operates in this circuit and at its inner upper front contact applies ground to conductor 734 which serves to lock relay 635 over its middle lower front contact. This ground also causes relay 627 to operate in an obvious circuit which includes the innermost lower front contact of relay 635. Relay 635 in operating operates relays, such as 632, of all other coin supervisory links to preclude the possibility of the same coin supervisory circuit from being connected to a trunk through one of the other links. The operation of relay 628 starts the process for releasing the 624 lock-out relay of the link. However, the ground is not fully removed from this path until relay 217 of the trunk circuit is released on the operation of relay 407. Relays 626 and 635, however, are locked operated. With relay 635 operated and relay 634 released, relay 632 operates over an obvious circuit and prevents the reseizure of this coin control circuit as previously described. Relay 627 locks by its lower front contact to all other links which are waiting for their call to be served. Relay 627 is a gating relay which prevents new calls from being served in a link which has already had a call served, until the calls waiting in other links are served.

Relay 407 upon operating, at its inner upper contacts, establishes the circuit for relay 408 which relay operates and opens at its back contacts the previously traced circuit of relay 217 which now releases and removes ground at its upper armature and front contact from the conductor 299, which conductor as hereinbefore described is extended, by way of the link lead 637, to the charge conductor 639 which terminates in terminal 901 of arc T3 of the switch T. It will be noted at this time that when relay 712 operated, as previously described, it connected ground to the lead 639 so that the terminal 901 of arc T3 of switch T is maintained marked with ground potential after relay 217 releases.

Relay 228 now operates in a circuit which may be traced from grounded battery, lower winding of relay 715, back contact and innermost lower armature of relay 716, winding 717 of hybrid coil H, front contact and middle lower armature of relay 703, conductor 701 and corresponding front contacts of relay 635, link lead 640 and corresponding front contacts of relay 626, conductor 297, No. 7 contacts of relay 229, winding of relay 228, No. 2 contacts of relay 229, conductor 298 and corresponding front contacts of relay 626, link lead 641 and corresponding front contacts of relay 635, conductor 702, outermost lower armature and front contact of relay 703, winding 718 of hybrid coil H, second lower armature and back contact of relay 716, to ground through the upper winding of relay 715. Relay 715 operates with relay 228 in this circuit.

Relay 408 upon operating, incident to the operation of relay 407, as described, connects, at its outermost upper armature and front contact, a double frequency tone source 409 to the conductor 499 which, by way of the No. 7 contacts of relay 229 is connected to conductor 297, thence to link lead 640, conductor 701 to the hybrid coil H for a purpose which will appear from a later description; connects the winding of relay 407 over its No. 1 contacts and conductor 285 directly to the sleeve lead SL; and establishes a circuit for relay 412 which may be traced from battery through its winding, over conductor 413, the No. 6 back contacts of relay 229, contacts of relay 228, conductor 414, to ground over its No. 6 contacts.

Relay 412 now operates, locks in a circuit extending from battery through its winding, over conductor 413, the No. 6 back contacts of relay 229, conductor 415, its No. 4 contacts to ground over the No. 6 contacts of relay 408; at its No. 2 back contacts removes ground from conductor 416 extending to the line discharge network comprising resistances 230, 231 and condenser 232; at its No. 3 contacts connects resistances 514 and 515 across the calling line in bridge of the windings of relay 213 in a circuit which may be traced from battery, through the upper winding of relay 213, the No. 1 back contacts of relay 204, the No. 3 back contacts of relay 229, conductor 233, the No. 6 back contacts of relay 417, the No. 2 back contacts of relay 418, the No. 3 contacts of relay 412, conductor 419, serially through resistances 514 and 515, conductor 420, the No. 6 back contacts of relay 204, to ground through the lower winding of relay 213; and connects ground over its No. 5 contacts and conductor 421 to the fixed contact of interrupter 505. As soon thereafter as the interrupter cam 505 causes the closure of its contacts, a circuit is completed from ground connected to conductor 421, thence over conductor 422, over the inner lower normal contacts and through the winding of counting relay 423 and resistance 425 to battery, and through the winding of relay 424 and resistance 426 to battery.

Relay 423 now operates, but the winding of relay 424 being shunted over its own No. 7 back contact does not operate so long as the contacts of interrupter 505 are closed. Relay 423 upon operating, locks over its inner lower alternate contacts to ground over the No. 5 contacts of relay 412. Upon the next opening of the contacts of interrupter 505, the initial operating circuit of relay 423 is opened and relay 424 now operates in a circuit from battery through resistance 426, through its winding, over the inner lower alternate contacts of relay 423 to ground over the No. 5 contacts of relay 412. With relay 424 now operated, a shunt is estabilshed from conductor 419 over the No. 1 contacts of relay 424, and conductor 432 around resistance 514 thereby reducing the shunt across the calling line to a value of 50 ohms. With relays 423 and 424 both operated, the circuit of relay 500 is established from battery, through its winding, conductor 516, the No. 3 contacts of relay 424, the lower contacts of relay 423 to ground at the No. 2 contacts of relay 417. Relay 500 upon operating, shunts resistance 515 over its upper contacts thereby reducing the resistance of the shunt across the calling line to zero.

Upon the next closure of the contacts associated with interrupter cam 505 ground is connected from conductor 421 over such contacts, conductor 422, the No. 7 front contacts of relay 424 to a point between the winding of relay 423 and resistance 425, whereupon the winding of relay 423 becomes shunted and relay 423 releases. The circuit of relay 500 is now opened at the lower contacts of relay 423 and relay 500 releases. With relay 423 released and relay 424 still operated, a circuit is established from battery through the winding of relay 204, over conductor 234, the inner upper back contacts of relay 423, the No. 6 contacts of relay 424, to ground applied to conductor 427 over the lower contacts of relay 407. Relay 204, operated, disconnects the windings of relay 213 from the calling line at its Nos. 1 and 6 back contacts while the line is still short-circuited; establishes a holding circuit for relay 403 extending from battery through its winding, over the No. 5 back contact of relay 400, the No. 3 contacts of relay 401, conductor 428 to ground at the No. 7 front contact of relay 204; transfers the tip and ring trunk conductors 205 and 206 at its Nos. 2 and 8 contacts from contacts of relay 203 to contacts of relay 229 in preparation of the return of the initially deposited coin at the coin box 101 of the calling line, and establishes the operating circuit for counting relay 418 which may be traced from battery through resistance 429, the winding and the No. 5 normal contacts of relay 418, the upper back contacts of relay 423, conductor 235, the No. 3 contacts of relay 204, conductor 236, the No. 4 contacts of relay 424, to ground at the No. 2 front contact of relay 412. The operating circuit for counting relay 417 is also prepared at this time from ground, thence as traced over the No. 5 normal contacts of relay 418 through the winding of relay 417 and resistance 430 to battery, but the winding of relay 417 is shunted at this time over its own No. 7 back contact so long as relay 424 remains operated and relay 417 does not therefore operate. Relay 418 upon operating now locks over a circuit from battery through resistance 429, its winding and No. 5 alternate contacts, conductor 235 and thence to ground as traced.

*Return of initially deposited coin*

With relay 418 operated, coin return battery is connected from the source 517, over the No. 9 back contacts of charge relay 518, conductor 519, lower front contacts of relay 403, No. 1 back contacts of relay 406, No. 1 back contacts of relay 417, No. 4 front contacts of relay 418, conductor 431, over the Nos. 1 and 8 back contacts of relay 229 and the Nos. 2 and 8 front contacts of relay 204, thence as traced over the tip and ring conductors of the established connection through the magnet of coin box 101 to ground over contacts closed thereat by the deposited coin. The coin box magnet is now energized in such a manner as to deposit the coin in the return chute where it may be recovered by the calling person.

Upon the second opening of the contacts associated with interrupter cam 505, the holding circuit for counting relay 424 extending from ground on conductor 421, over the contacts of interrupter 505, conductor 422, the inner lower normal contacts of relay 423, through the winding of relay 424 and resistance 426 to battery is opened, and relay 424 releases. With relay 424 released, the shunt about the winding of relay 417 is removed and relay 417 operates over a circuit from battery through resistance 430 and its own winding, over the No. 5 alternate contacts of relay 418, conductor 235, the No. 3 contacts of relay 204, conductor 236, the No. 7 contacts of relay 418, to ground at the No. 2 front contacts of relay 412. On the third closure of the contacts of interrupter cam 505 the previously traced circuit for relay 423 is established whereupon the relay reoperates, but relay 424 being shunted over its own No. 7 back contacts does not operate at this time. With relay 417 now operated, the circuit over which coin return current was applied to the coin box 101 is opened at the No. 1 back contact of relay 417, and the capacity discharge of the calling line is established over the tip and ring conductors of the calling line extended through the operation of relay 204 to the Nos. 1 and 8 back contacts of relay 229 and thence through resistances 230 and 231 and condenser 232 to ground.

Upon the third opening of the contacts of interrupter 505, the shunt of the winding of counting relay 424 is opened and relay 424 operates over the previously traced circuit. Upon the fourth closure of the contacts of interrupter 505, relay 423 is shunted down in the manner previously described and a shunt of the winding of relay 418 is thereupon established from a point between its winding and resistance 429, over the No. 7 front contacts of relay 417, the upper back contacts of relay 423, conductor 235, the No. 3 contacts of relay 204, conductor 236, the No. 4 contacts of relay 424, to ground at the No. 2 front contacts of relay 412. A circuit is now established from battery through the winding of relay 406 over conductor 433, the No. 6 back contacts of relay 200, conductor 237, the No. 3 back contacts of relay 418, the No. 8 contacts of relay 417 to ground over the No. 6 contacts of relay 401, whereupon relay 406 operates, locks over its No. 5 contacts to ground over the No. 6 contacts of relay 401, and establishes a circuit from battery through the winding of relay 229, over conductor 238, the No. 4 contacts of relay 406, the No. 4 contacts of relay 417, the upper contacts of relay 407, to ground at the No. 7 back contacts of relay 400. Relay 229 upon operating, locks over its No. 5 contacts, conductor 239 to ground at the inner lower front contacts of relay 407; disconnects the calling line discharge circuit at its Nos. 1 and 8 back contacts; opens the circuit over which relay 228 was energized at its No. 2 and No. 7 back contacts; opens, at its No. 7 back contacts, the circuit over which tone current from the source 409 was applied to the coin control circuit; connects the tip conductor of the calling line as traced over the No. 8 front contacts of relay 204, thence over the No. 8 and No. 7 front contacts, conductor 297, link conductor 640 by way of the corresponding front contacts of relay 626, corresponding front contacts of relay 635, conductor 701, middle lower armature and front contacts of relay 703 to the upper terminal of winding 717 of hybrid coil H, and connects the ring conductor of the calling line as traced over the No. 2 front contacts of relay 204, thence over its Nos. 1 and 2 front contacts, conductor 298, link conductor 641 by way of the corresponding front contacts of relay 626, corresponding front contacts of relay 635, conductor 702, lowermost armature and front contact of relay 703 to the lower terminal of winding 718 of hybrid coil H.

Upon the fourth opening of the contacts of interrupter 505, the holding circuit of counting relay 424 is opened and relay 424 now releases, in turn opening the holding circuit of relay 417 at its No. 4 contacts. With relay 424 released and relay 229 operated, relay 412 now releases and establishes a discharge path for condenser 232 through the 1600-ohm resistance 231, over conductor 416 to ground at the No. 2 back contact of relay 412.

*Automatic coin deposit request*

There has been described thus far, the initial deposit by a calling subscriber, usually a nickel, in the coin box receptacle at station 100; the receipt of dial tone by the calling subscriber; the dialing of a number indicative of a ten-cent toll call; the consequent seizure of the tandem trunk by way of the set of terminals 107 allocated to calls intended for completion in a ten-cent area; the seizure of link L in the circuit of Fig. 6; the marking of the ten-cent terminal 901 of the arc T3 of the switch T; the preparation of the coin controlled pronouncement circuit; the connection of the tone source 409 to the alternating-current signal receiver ACR by way of the pronouncement circuit; and the return of the initial deposit at the calling station.

At the upper right corner of Fig. 7 there are schematically represented two magnetic type message reproducers, or telegraphones 720 and 721. The particular form or design of these devices is not critical to the present invention but it is intended that they be operating whenever a coin controlled pronouncement circuit is taken into use. The telegraphone 720 corresponds to the trunk bank terminal set 107 which is allocated to calls for which the regular charge is ten cents, whereas the telegraphone 721 corresponds to the trunk bank terminal set 108 which, in the present assumed case, is allocated to calls for which the regular toll charge is fifteen cents. It will be understood that there are as many telegraphones 720 and 721 as there are separate terminal appearances for the tandem trunk, each corresponding to one such appearance and corresponding to a different toll charge such as ten cents, fifteen cents, twenty cents, twenty-five cents, etc.

Each telegraphone, such as 720 for example, is provided with a message start contact 722 which is so controlled that the contact 722 is closed only during the interval between the transmission of the message and opened during successive transmitting intervals.

It has previously been described how the ground at the lower contacts of relay 713 was substituted for the ground initially applied to the terminal 901 of the arc T3 of switch T when relay 712 operated and locked. When relay 712 operated and locked, as previously described, and when the telegraphone contact 722 is closed, a circuit for relay 724 is completed which may be traced from battery, winding and upper normally closed contacts of relay 724, conductor 726, lower contacts of relay 725, which relay operated in an obvious circuit under control of relay 715, conductor 727, inner upper back contacts of relay 728, inner lower front contacts of relay 712, to ground at the telegraphone contact 722. Relay 724 operates, and locks with relay 712 under control of release relay 713. This insures that the calling party will hear a complete announcement at the start.

With relays 712 and 724 operated and locked, the output of the telegraphone 720, through amplifier 723, is connected to the coil 729 of hybrid coil H by way of the outermost and middle upper back contacts of relay 728. Thus the message carried by the telegraphone 720 is impressed on the hybrid coil H. This message may be in any form such as to advise the calling party to deposit ten cents for the initial period of five minutes, and may be "Please deposit ten cents for five minutes."

It will be recalled that when the initial deposit of a nickel was refunded, the leads 701 and 702 now terminating at the outer terminals of windings 717 and 718 of hybrid coil H were extended to the calling line when relay 229 operated. The message carried by the telegraphone 720 accordingly is transmitted through the hybrid coil H to the calling line over the circuit previously traced, and the calling subscriber is automatically requested to deposit the required toll for the call he has initiated, in the present case ten cents. This message is repeated each time the contact 722 of the telegraphone 720 is closed.

*Checking the deposit of coins for initial period*

Heretofore it has been described how the tone source 409 (Fig. 5) was connected through the coin controlled pronouncement circuit to the alternating-current receiver ACR when relay 408 operated. The tone source 409 is indicated as consisting of two independent frequency sources *f* and *c*, one generating a frequency *f* and the other a frequency *c*. These frequencies are impressed on the conductors 297 and 298 during the time relay 229 was unoperated and incident to the operation of relay 408 as described, and were transmitted over the conductors 297 and 298, link conductors 640 and 641 and the corresponding front contacts of relays 626 and 635, conductors 701 and 702, the two lower front contacts of relay 703 to the terminals of windings 717 and 718 of the hybrid coil H.

The frequencies *f* and *c* accordingly were transmitted through the hybrid coil H to the conductors 730 which extend from the hybrid coil H to the alternating-current receiving circuit ACR of Fig. 10. These frequencies are employed to unlock the receiver circuit ACR as will be described presently. The coin indicating frequencies generated at the coin box station 100 in a manner described, have been so chosen that a combination of two frequencies is used to identify each coin, and each frequency combination includes the common frequency *f*. For example, the choice of frequency combinations for the various coins may be as follows:

| | |
|---|---|
| Frequencies *a, f* | $ .25 |
| Frequencies *b, f* | .10 |
| Frequencies *d, f* | .05 |

If it is assumed that the calling subscriber elects to pay for the initial call period by depositing two nickels in the coin box slot allocated to nickels, the frequencies *d* and *f* will be generated twice at the coin box of the calling station. Should he elect to deposit a dime, then the frequencies *b* and *f* would be generated but once for transmission to the receiving circuit ACR.

As hereinbefore indicated, when relay 703 operated and during the interval in which relay 229 was unoperated and relay 408 was operated, the frequencies *f* and *c* from the source 409 (Fig. 5) were transmitted over conductors 730 to the receiving circuit ACR (Fig. 10). It is deemed unnecessary to furnish a detailed description of the circuits shown in Figs. 10 and 11 in this application since a complete description thereof may be had from the aforenoted Patent 2,332,912. The elements of this receiving circuit as embodied in the present disclosure bear the same designation symbols which are employed to identify corresponding elements in the patent disclosure and their detailed functions are clearly set forth in the patent specification. Sufficient description of the circuits, however, will be included in this application to provide a clear understanding of their operation in so far as they apply to the present system. Briefly and broadly expressed, the function of the alternating-current receiver ACR is to selectively ground certain conductors in response to the receipt of corresponding frequencies from the transmitting, or calling station, which, in the present case is the calling station 100.

The frequency combination *f* and *c* serves in the present case as a "signal present" indication and functions primarily to unlock the signal receiver ACR. The so-called "signal present" channel is connected to the volume limiter VL ahead of the channel filters BPF*a* and BPF*b*, BPF*c*, BPF*d* ,and BPF*f* (it is to be noted that the channel filter BPF*e* and its related channel have been omitted in the present disclosure since it is not required) so that relay SPR will be operated when any signal of sufficient magnitude is available at the output of the limiter, whereas the channel relays R*a*, R*b*, R*c*, R*d* and R*f* will be operated only when frequencies passable through their correlated channel filters are present in the signal.

As previously indicated, frequencies *f* and *c* are supplied from the source 409 and reach the receiver ACR over the conductors 730 extending from hybrid coil H. The currents of frequencies *c* and *f* pass through the pad AP, the filter HPF and the left winding of transformer IT with the grounded resistance IN bridged thereacross. The signal voltage developed thereby in the left winding of transformer IT is induced into the right winding, amplified through the limiter VL, and then applied, partly across resistance N1 and partly across resistance N5, the former being applied to the left winding of transformer SPT of the "signal present" circuit, and the latter, through resistances N2, N3 and N4, to the input terminals of the channel filters BPF*a*, BPF*b*, etc. Since the filters BPF*c* and BPF*f* are each tuned to pass one of the two frequencies in the signal from source 409, the voltage thereof is applied to the grid electrodes of vacuum tubes T*c* and T*f* through resistances C*g* and F*g* but not to any of the other channel tubes.

Each of the channel tubes T*a*, T*b*, etc., as indicated in the aforementioned Hecht et al. patent, functions as a detector. Each channel is also provided with its own individual relay R*a*, R*b*, etc., the secondary winding (S) of each of which is connected in the anode circuit of its associated vacuum tube. The primary windings (P) of these channel relays are connected in series and obtain battery through the filter coil FLT. The other end of the series connection of the primary windings (P) of relays R*a*, R*b*, etc., is connected to resistance CH1 and thence to conductor L1 whence it traces back to the upper contact of relay SPR.

Consequently, when frequencies *c* and *f* are transmitted to the circuit ACR, a part of the voltage derived from the signal is applied to transformer SPT to cause the operation of tube S and that of its anode relay SPR which, upon operating, applies ground to the conductor J and thence to conductors L and/or L1, resistance CH1 and the primary windings of channel relays R*a*, R*b*, etc., while the remaining voltage is applied to the grid electrodes of tubes T*c* and T*f*, respectively. The interconnections of conductors J and L depends also upon the operation of a relay CI1, CI2 or CI3 of the coin register and adding circuit. The application of this remaining voltage to the grid electrodes reduces the value of the positive potential between grid and cathode normally thereon from battery through coil FLT and networks P4 and P5 in consequence of which the respective anode currents flowing through these tubes and the secondary (S) or bias winding of relays R*c* and R*f* are reduced, causing these two relays to operate on the current through their operate winding (P), the circuit of which may be traced from battery through the filter coil FLT, serially through the primary winding (P) of all the relays R*a*, R*b*, resistance CH1 and thence as already traced to ground on the contacts of relay SPR.

It will be noted that the current which causes the operation of relays R*c* and R*f*, while flowing through the operate winding (P) of all the channel relays, yet will only cause the operation of the two relays R*c* and R*f* since the current in the secondary winding (S) of each of the other channel relays has not been diminished by any material alteration in the control grid potentials of their respective tubes.

With relays R*c* and R*f* thus operated, ground is disconnected from conductors 5 and 12, which remove ground from the secondary winding (S) of relay KP1, the path of the ground being by way of the No. 1 normally made contacts of relays KP2 and KP3 and through the armature and left contact of relay KP1.

Relay KP1 now operates slowly over an obvious circuit through its operate winding (P), the slowness of its operation being due to the charging current for condenser KPC flowing through its secondary winding (S) and resistance KPR1, which current opposes the current flowing through the primary winding (P). When the condenser KPC is completely charged, the current flowing through the winding (S) of the relay is limited by the high resistance KPR, and since the resulting magnetic flux is smaller than that produced by the current flowing through the primary winding (P) the relay is caused to operate.

Now when the signal from the tone source is terminated due to the operation of relay 228 as described, the release of either relay R*c* or R*f* will cause ground to be connected to conductor 5 or 12, respectively. Since these two conductors are joined at the No. 1 normally made contacts of relays KP2 and KP3 and since relay KP1 is now operated, the ground on conductor 5 or 12, or both, is applied to the winding of relays KP2 and KP3 via the armature and right contact of relay KP1. Since battery is connected to the other terminals of the windings of each of these two relays by conductor BAT2, both relays will operate and lock to ground on the No. 5 contacts of relay KP2. Relay KP2, over its No. 8 front contacts, now reapplies ground to the secondary winding (S) of relay KP1, increasing the current flow therethrough in consequence thereof and causing relay KP1 to release and reestablish its armature into engagement with the left contact.

Figure 5:
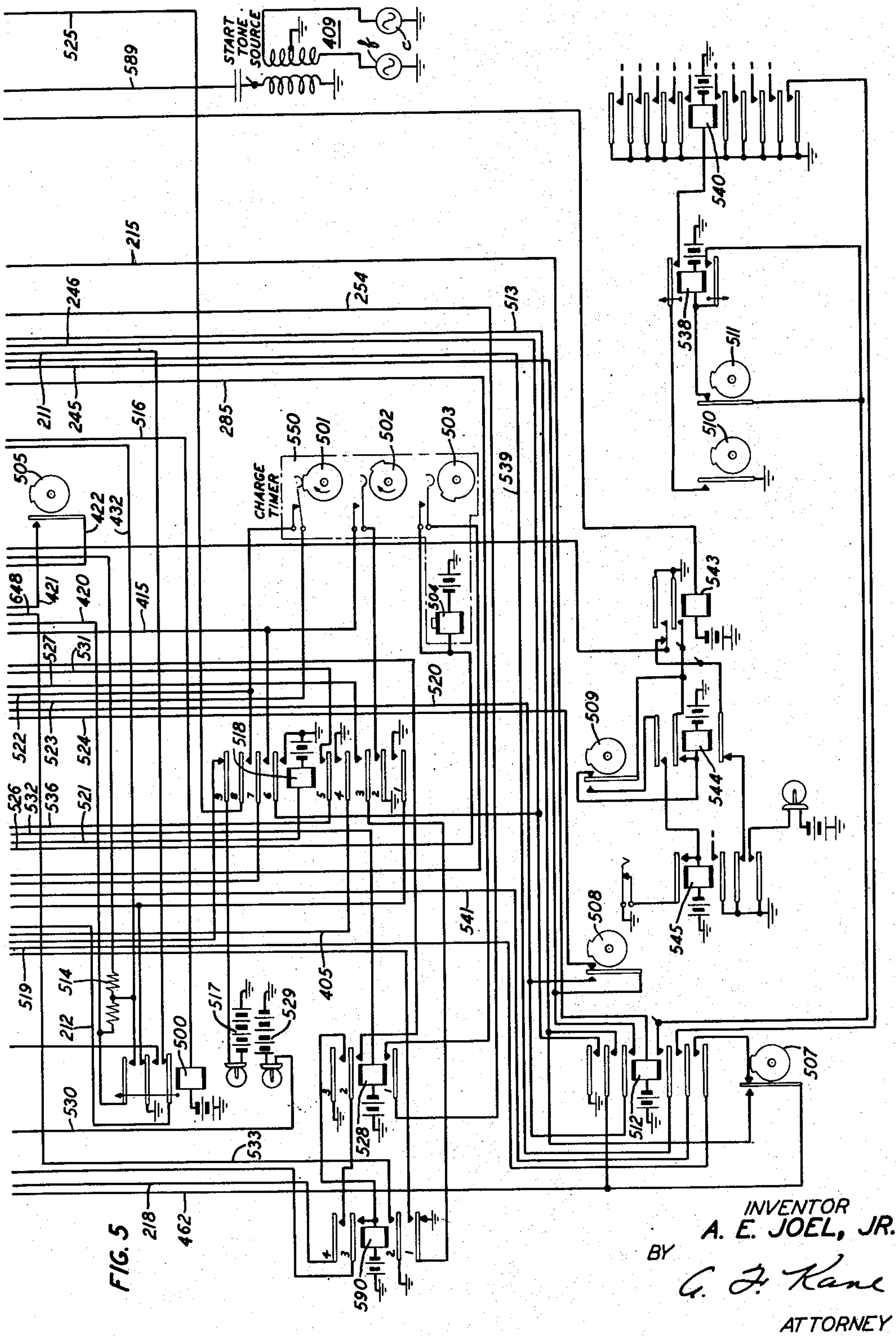

Relays KP2 and KP3, upon operating, perform the general function of extending the upper contacts of the channel relays R*a*, R*b*, etc., to conductors A, B, D and F, the conductor F being connected to the armature of each of the relays 1100, 1101 and 1102, and conductors D, B and A being connected to the windings of these relays, respectively. Thus, subsequent operations of relays R*a*, R*b*, R*f* and R*d* in various combinations will cause relays 1100, 1101 and 1102 to be selectively operated. Thus, the receiver ACR is "unlocked" as evidenced by the operation of relays KP1, KP2 and KP3 incident to the transmission of frequencies *c* and *f* over conductors 730 from the source 409 (Fig. 5).

As previously indicated, the coins deposited at station 100 are identified by the transmission of various combinations of two frequencies *a*, *b*, *d* and *f*, sent simultaneously. In the present case of a ten-cent call, it will be assumed that the calling party elects to deposit a dime in payment for the initial period. Frequencies *b* and *f* accordingly will be generated at the station 100 and transmitted to the receiver ACR over the circuit previously indicated. It is believed unnecessary to describe in detail how each transmitted frequency functions in the circuit ACR. Suffice it to say that relay R*f* responds to the frequency *f*, to apply ground to conductor F and relay R*b* to the frequency *b*, to apply ground to conductor B.

When relay 703 operated incident to the operation of relay 712 as previously described, at its innermost lower armature and front contact it extended the now grounded sleeve conductor 704 to the upper armature and back contact of relay 713 and thence to battery through the winding of relay 714. Relay 714 operates in this circuit and at its outer upper armature and front contact applies ground to the contact of timing cam 733 of the timing-out circuit TS to start the timing-out cycle which will be described hereinafter. At its inner upper armature and front contacts relay 714 applies ground to conductor 734 which serves to hold relay 635 locked in its operated position and also to cause the energization of the upper winding of relay 627 over the innermost contacts of operated relay 635. Relay 627, operated, locks under control of relay 631 and, at its upper contacts, removes ground from the armatures of the trunk preference relays such as relays 624 and 625. Relay 626, however, will not release since it is locked operated to ground at the innermost upper front contacts of relay 635.

At its innermost lower armature and front contact, relay 714 connects ground to conductor 735, over conductor 800, No. 6 back contacts of relay CI2, contacts 801 of relay R51, contacts 802 of relay R101, contacts 803 of relay R251, to battery through the winding of relay CI1. Relay CI1 of the coin register and adding circuit (Fig. 8) operates in this circuit thereby preparing the so-called nickel, dime and quarter relays R51, R101 and R251, respectively, of the first register for selective operation under control of the alternating-current signal receiver ACR once relays KP1 and KP2 have operated.

When the dime is deposited in the coin box chute allocated for such coin, frequencies *b* and *f* are generated at the station 100 and transmitted to the receiver circuit ACR to cause relays R*b* and R*f* to operate, causing the application of ground to conductors B and F (Fig. 11). The grounding of conductor B causes relay 1101 to operate over an obvious circuit. Relay 1101, upon operating, connects the now grounded conductor F to conductor 804 to cause the operation of the first register dime relay R101 over the No. 4 front contacts of relay CI1.

Relay R101, operated, locks in a circuit which is traced from battery, through its winding and its contacts 805, normally closed contacts of relay AI1, conductor 735 to ground at the front contact and innermost lower armature of relay 714. With relay R101 operated, the operating circuit for relay CI1 is opened at contact 802 whereupon relay CI1 releases and, at its No. 1 contact, opens the J–L circuit to the receiver ACR causing relays R*b* and R*f* to release in a manner fully described in the aforementioned Patent 2,332,912.

Relay CI2 of the second register now operates in a circuit extending from battery, through its winding, contacts 806, 807 and 808 of the second register relays R252, R102 and R52, respectively, contacts 809 of relay R101, the No. 6 contacts of relay CI1 (released) to ground at the innermost lower armature and front contact of relay 714 by way of conductors 800 and 735. The operation of relay CI2 is preparatory to the registering of the next coin, if any, deposited by the calling party at station 100. At its No. 7 front contacts relay CI2 extends the ground on conductor 800 to conductor 810 and thence over the upper normally closed contacts of relays 735 and 736, to battery through the winding of relay 728. Relay 728 operates in this circuit and, at its outermost and middle upper armatures, disconnects the telegraphone 720 from the calling line thereby discontinuing the tariff request pronouncement. Thus when relay CI2 operates, it indicates the receipt of the first coin signal by the coin adding and receiving circuit and transmits this information to the telegraphone cut-off relay 728 to cause it to effect the discontinuance of the transmission of the pronouncement carried thereby. Relay 728 locks by way of its lower contacts under control of relay 713.

When relay CI1 released, it caused relay AI1 to operate in a circuit extending from battery through the winding of relay AI1, over the inner upper front contacts of relay R101, upper back contacts of relay R51, the No. 2 back contacts of relay CI1, conductor 811, normally closed No. 7 contacts of relays AI2 and AI3 to ground on conductor 735 as previously traced. With relays R101 and AI1 operated, a circuit is completed extending from ground at 813, over the No. 7 contacts of relay AI1, upper front contacts of relay R101, the No. 5 contacts of relay AI1, conductor 814, brush of arc AIS3 of switch AIS, terminal 815 thereof, conductors 816 and 817 to terminal 818 of arc T2 of totalizing selector T. This ground marks the terminal 818 of arc T2 of the switch T and determines the number of steps to be taken by the switch T.

When relay AI1 operated, a circuit for stepping magnet 920 of selector switch T is established which extends from battery, winding and interrupter contacts of magnet 920, lower back contacts of relay 921, conductor 900, the No. 3 contacts of relay AI1, to ground on conductor 735 as previously traced. At its No. 1 front contacts relay AI1 transfers the locking circuit of relay R101 to conductor 819 and thence to ground on conductor 735 by way of the lower back contacts of relay 922, conductor 900, and the No. 3 contacts of relay AI1.

Magnet 920, upon operating, steps the selector T around in well-known manner and its stepping operation continues until the brush of arc T2 encounters the marked terminal 818. Selector T therefore advances two steps. Relay 921 then operates over an obvious circuit; opens the operating circuit to stepping magnet 920; and locks to ground on conductor 900 as previously traced. At its lower front contacts, relay 921 extends the ground on conductor 900, by way of the upper armature and back contacts of relay 922, to the interrupter contacts and winding of stepping magnet 924 to battery. With its operating circuit open, the stepping magnet 920 ceases operating and the selector T comes to rest on the marked terminal 818 as described.

When the selector switch T ceases stepping, the brushes of the several arcs thereof are situated as follows: brush of arc T1 rests upon terminal 923; brush of arc T2 rests upon terminal 818; brush of arc T3 rests upon terminal 901 to which the ten-cent charge lead 639 has been connected; and the brush of arc T4 rests upon terminal 904.

It will be observed that the terminal 923 of arc T1 of selector T is strapped to the terminal 925 of arc AIS1 of the selector AIS. Thus, under the action of stepping magnet 924, whose operating circuit was completed when relay 921 operated as described, the selector AIS steps its brushes around until the brush of arc AIS1 encounters terminal 925. When this occurs, relay 922 operates to open the circuit to stepping magnet 924 and thus stop the selector. The operating circuit for relay 922 may be traced from battery through its winding and its normally closed lower contacts, brush and terminal 925 of arc AIS1 of selector AIS, terminal 923 and brush of arc T1 of selector T, lower front contact of relay 921 to ground on conductor 900 as previously traced. Relay 922 locks to ground on conductor 900 and, at its lower back contacts, opens the locking circuit for relay R101. Relay R101 thereupon releases causing relay AI1 to release. Relay AI1 upon releasing removes ground from conductor 900 causing relays 921 and 922 to release.

With the switches now set as described, selector T having advanced two steps as determined by the grounding of the brush of arc AIS3 incident to the operation of the dime relay R101 in the first register of the coin register and adding circuit, which brush rested upon terminal 815 which is strapped to the terminal 818 of arc T2 of selector T, relays 820 and 821 operate in parallel over conductor 822, brush of arc T3 of selector T and terminal 901, to ground on charge conductor 639. Relay 820 locks to ground on the off-normal ground conductor 735. With all relays AI2, AI2 and AI3 released, relay 830 operates in a circuit from ground on conductor 735, the No. 7 normally closed contacts of relays AI3 and AI2, the No. 2 contacts of relay AI1, winding of relay 830 to battery. At its upper contacts relay 830 completes a locking circuit for relay 821. At its lower contacts, relay 830 extends the ground on conductor 735 to the lower armature of relay 820, and thence over its front contact, conductor 823, brush of arc T4 of selector T and terminal 924 thereof, the interterminal strappings of arc T4, interrupter contacts and winding of stepping magnet 920 to battery. The stepping magnet 920 operates in this circuit and steps the selector T around to its normal position in which the brush of arc T4 thereof rests upon terminal 927. The ground on conductor 823 is thus transferred to the brush of arc AIS5 of selector AIS, to terminal 926 thereof, thence over the interterminal strappings of arc AIS5, interrupter contacts and winding of stepping magnet 924 to battery. Stepping magnet 924 operates in this circuit to step the selector AIS to its normal position. Thus both selectors are restored to normal.

With relays 820 and 821 operated and both selectors T and AIS restored to normal, a circuit is completed extending from ground on conductor 735, the No. 7 normally closed contacts of relays AI3 and AI2, the No. 2 contacts of relay AI1, lower contacts of relays 830 and 820, conductor 823, brush of arc T4 and terminal 927 of selector T, brush of arc AIS5 and terminal 928 of selector AIS, conductor 825, lower front contacts of relay 821, "advance" conductor 831, to battery through the winding of release relay 713.

Relay 713 operates in this circuit. At its lower contacts relay 713 removes the locking ground for relays 703, 712 and 724 causing these relays to restore their armatures. Relay 714 now releases, its operating circuit being opened at the upper contacts of relay 713 and also at the innermost lower contacts of relay 703. The effect of the opening of the sleeve conductor 704 at the innermost lower contacts of relay 703 will be set forth hereinafter.

When relay 703 releases, the windings 717 and 718 associated with hybrid coil H are disconnected from the tip and ring conductors 701 and 702. Relay 714, released, removes ground from the timing circuit TS; removes ground from conductor 734 causing the release of link relays 627 and 635 which release and open the circuit for trunk connector relay 626 causing the release of this relay which disconnects the link L from the trunk.

Relays 715 and 725 now are released. Relay 715 releases upon the release of relay 703 as described. Relay 713 releases when relay 714 released and removes ground from lead 735; thus, the circuit of Fig. 7 is restored to normal.

*Timing-out circuit TS*

It will be recalled that relay 714 was operated over the sleeve conductor 704 when relay 703 operated incident to the operation of charge relay 712, and at its outer upper armature connected ground to the contact of timing cam 733. If the calling subscriber fails to deposit a coin as requested by the pronouncement carried by the telegraphone 720, the apparatus involved in registering and totalizing the deposited coins would be tied up unless some precautions to preclude this possibility were taken.

Thus, when the timer cam 733, which is constantly rotating under any well-known type of control, first functions to close its alternate contacts, relay 738 operates in an obvious circuit and locks under control of relay 714. When the cam 733 rotates sufficiently far to remake its normal contacts, relay 739 operates in an obvious circuit which includes the lower armature and front contacts of relay 738. Relay 739 also locks under control of relay 714.

At its upper contacts, relay 739 establishes an obvious operating circuit for relay 737. With relay 737 operated, lamp 740 located at a monitoring operator's position is lighted in a circuit traced from battery, filament of lamp 740, inner back contacts of relay 710, upper back contacts of relay 741, upper front contacts of relay 737, to ground at the outermost lower back contacts and armature of relay 716.

Upon noting the lighted lamp 740, the monitoring operator would insert a plug of her cord (not shown) into jack 744 associated with lamp 740. Ground associated with the sleeve conductor of the monitoring operator's cord is extended over the sleeve contact of jack 744 to battery through the winding of relay 741. Relay 741 operates in this circuit and at its upper back contact opens the circuit for monitoring lamp 740, causing this lamp to be extinguished. Relay 716 now operates in a circuit traced from battery, winding of relay 716, inner lower front contacts of relay 737, lower front contacts of relay 741 to ground. Relay 716 locks under control of relay 714; at its first and second lower armatures and contacts it extends the tip and ring conductors of the calling line to the terminals of jack 744 and disconnects the supervisory relay 715 from the line.

It will now be noted that with relay 716 operated and the monitoring operator's cord plugged into jack 744, the monitoring operator is in a position not only to converse with the calling party but also to listen to the pronouncement being transmitted over the calling line. The system is so devised that the monitoring operator receives the pronouncement carried by the telegraphone which insures her of knowing what tariff the calling party has been requested to deposit in the coin box at station 100. This is effected in the following manner by relays 736 and 745. With relays 712 and 741 operated, and relay 728 unoperated, the ground from the telegraphone "no message" contact 722 is transmitted to battery by way of the lower normally closed contacts and winding of relay 736 and resistance 747, and through the resistance 746 by way of the back contacts of relay 745. Relay 745 is normally short-circuited by its own back contacts and the lower normally closed contact of relay 736. Relay 736 accordingly operates on the first ground pulse from the contact 722 whereas relay 745 does not operate. Relay 736 locks to ground at the lower back contacts of relay 713. During the interval relay 736 is operated and relay 745 is released which corresponds to the pronouncement transmitting time for telegraphone 720, the output of the telegraphone is impressed on the winding 729 of the hybrid coil H and is thus transmitted through the repeating coil R to the calling line and to the monitoring operator's telephone, it being understood that both relays 703 and 716 are operated as described. The operator thus hears the pronouncement carried by the telegraphone 720 and is advised of the tariff rate for the call initiated by the party at station 100.

When the contact 722 is opened at the end of the pronouncement period, ground is removed from one of the terminals of relay 745 so that this relay now operates in a circuit extending from grounded battery, resistance 746, winding and normal contacts of relay 745, locking contacts of relay 736 to ground at the lower back contact of relay 713. With relay 745 operated the pronouncement cut-off relay 728 operates in an obvious circuit and, at its outermost and middle upper armatures, disconnects the telegraphone output from the hybrid coil H. When the contact 722 again closes, relay 736 is short-circuited and releases. In releasing, relay 736 is prevented from establishing a short circuit about relay 745 by a lower break contact on that relay. With relay 728 operated and now locked at the upper normally closed contacts of relay 736 further closures of the telegraphone contact 722 are ineffective to operate relays 736 and 745.

The operator may now converse with the calling party at station 100 and take whatever steps may be required under the circumstances.

*Completion of the desired connection*

When the selector switches T and AIS have functioned to indicate the deposit of an amount in the coin box at station 100 which amount checks with the required tariff indicated by the marking of the terminal 901 of arc T3 of selector switch T allocated to ten-cent tariffs, the initiated call is allowed to advance to completion. The deposit of the correct amount is indicated by the joint operations of relays 820 and 821 which combine to apply ground to the advance lead 831 as previously described.

When relay 703 releases, as previously described, the sleeve conductor 704 is opened thus opening the operating circuit for relay 407, it being recalled that relay 407 operated in series with relay 714 over the sleeve conductor. When relay 407 releases, it in turn releases relays 204, 229 and 408. Relay 204 upon releasing again connects the windings of relay 213 to the calling line and restores supervision to the tandem trunk, and relay 408 upon releasing establishes the circuit of relay 200 which may be traced from battery through its winding over conductor 242, the No. 8 contacts of relay 406, the No. 7 back contacts of relay 408, conductor 211, the inner upper back contacts of relay 500, conductor 212 to ground at the No. 3 normal contacts of relay 400. Relay 200 upon operating, locks over conductor 242, the No. 8 contacts of relay 406, conductor 243, its own No. 5 contacts to ground on conductor 212; opens the circuit of relay 201 at its No. 7 back contacts, whereupon relay 201 releases; and over its Nos. 2 and 8 front contacts completes a talking circuit between the calling line and outgoing conductors 302 and 303 of the tandem trunk and bridges the winding of polarized relay 244 across such outgoing trunk conductors.

With relay 200 operated, a circuit is established from battery through the winding of relay 321 at the tandem sender, over the lower normal contacts of relay 320, the upper alternate contacts of relay 307, the back contact of relay 306, contacts of cam 305, trunk conductor 302, the No. 8 front contact of relay 200, the winding of polarized relay 244, the No. 2 front contacts of relay 200, trunk conductor 303, contacts of cam 313, the back contacts of relay 312, the inner lower alternate contacts of relay 307, the upper normal contacts of relay 320 to ground through the winding of relay 322 at the tandem sender. The current flowing over this circuit through the winding of polarized supervisory relay 244 is in such a direction as to operate the armature thereof against its right contact. Relays 321 and 322 at the tandem sender are both now operated, in turn operating relays 323 and 324. With relay 324 operated, the circuit of relay 325 is opened at its back contacts and relay 325 releases to make the start circuit for the timing-out of the tandem sender operative to function in the usual manner. A circuit is also established from ground over the lower front contacts of relays 323 and 324 through the winding of relay 327 to battery, whereupon relay 327 operates, locks in a circuit over its lower contacts, the inner upper contacts of relay 326 and the upper front contacts of relays 324 and 323 to ground. Relay 336 is also operated in a circuit from battery through its winding, over the upper front contacts of relays 324 and 323 to ground and, upon operating, locks over its lower front contact, the lower front contacts of relay 327 to ground over the lower front contacts of relays 324 and 323. Relay 327, upon operating, opens the locking circuit of relay 326 which relay thereupon releases, in turn opening the locking circuit of relay 327, but relay 327 is now held operated under control of relays 323 and 324 and relay 336 over a locking circuit extending over its lower front contacts, the lower front contacts of relay 336 to ground over the upper front contacts of relays 323 and 324. With relay 327 operated, the fundamental circuit is established over its upper contacts through the winding of trunk test relay 337, contacts of cams 338, 339 and 347 of the sender and contacts of cams 340 and 341 in the tandem district selector. The tandem sender now proceeds to complete the desired connection in accordance with the digital information registered therein in the usual manner. When the connection is completed, the tandem sender is dismissed and the sequence switch of the tandem district selector is advanced to the trunk closure position in which position a circuit is established from battery through the left winding of relay 342, the upper back contacts of relay 343, the upper left winding of repeating coil 344, contacts of cam 305, trunk conductor 302, the No. 8 front contacts of relay 200, winding of relay 244, the No. 2 front contact of relay 200, conductor 303, contacts of cam 313, the lower left winding of repeating coil 344, the lower back contact of relay 343 to ground through the right winding of relay 342. The direction of the current flowing is still in such a direction as to hold the armature of relay 244 against its right contact.

*Response of the called subscriber*

When the called subscriber answers, a circuit is completed which may be traced in part over the contacts of cam 341, through the upper right winding of repeating coil 344, winding of supervisory relay 345, contacts of cam 346, the lower right winding of repeating coil 344 and the upper contacts of cam 340 to cause the operation of relay 345 followed by the operation of reversing relay 343. Relay 343, upon operating, reverses the connections of battery and ground through the windings of relay 342 to the trunk conductors 302 and 303, whereby current now flows in such a direction through the winding of polarized relay 244 to cause the armature to move into engagement with its left contact. As soon thereafter as interrupter cam 508 closes its left contact, a circuit is established from ground over the No. 4 contacts of relay 200, the left contact of relay 244, conductor 245, left contact of interrupter 508, conductor 520 to battery through the winding of relay 434, which relay thereupon operates and locks over its inner upper contacts to ground applied to conductor 245 by relay 244. As soon thereafter as interrupter 508 closes its right contact, relay 434 establishes a circuit for relay 518 which may be traced from battery through its winding, over conductor 521, the No. 6 back contacts of relay 435, conductor 522, contacts closed by cam 501 of the charge timer 550, which timer is in its normal position, conductor 523, the No. 5 back contacts of relay 435, the lower front contact of relay 434, conductor 524, over the right contact of cam 508 to ground on conductor 245. Relay 518, upon operating, locks in a circuit extending from battery through its winding, over conductor 521, the No. 6 back contacts of relay 435, conductor 522, the No. 8 contacts of relay 518, conductor 525, the No. 5 back contacts of relay 417 to ground over the No. 6 contacts of relay 406; connects ground over its No. 4 contacts to conductor 405 to hold relay 401 operated; establishes an operating circuit for relay 512 which may be traced from battery through its winding, over conductor 215, the No. 3 front contacts of relay 200 and conductor 246 to ground over the No. 6 contacts of relay 518, and starts the charge timer 550 for measuring the initial period for conversation by operating clutch magnet 504. The circuit for magnet 504 may be traced from battery through its winding, over conductor 526, the No. 3 back contacts of relay 435, conductor 527, the No. 3 contacts of relay 518 to ground.

The energization of magnet 504 causes a gear train to engage with a shaft driven by a telechron motor. Four and one-half minutes later a circuit is established for relay 412 which may be traced from battery through its winding, over conductor 413, the No. 6 back contacts of relay 229, conductor 415, the contacts closed by timer cam 502, to ground over the No. 2 front contacts of relay 518. Relay 412, upon operating, connects ground to one contact of interrupter cam 505, connects the two 50-ohm resistances 514 and 515 across the calling line and removes ground applied over conductor 416 from the line discharge network comprising resistances 230 and 231 and condenser 232 in a manner described in connection with its previous operation. Under the control of interrupter 505, counting relay 423 is operated upon the first closure of the interrupter contacts and prepares the operating circuit for counting relay 424 which thereafter operates upon the following opening of the interrupter contacts. With both relays 423 and 424 operated, resistance 515 is short-circuited thus reducing the resistance bridged across the calling line to 50 ohms and relay 500 is operated to shunt resistance 514, thus further reducing the bridged resistance to zero. The application and reduction of the shunt across the calling line is for the purpose of diverting the current from the line prior to the connection of coin control battery thereto in order to prevent disturbances from reaching the called subscriber through the tandem and terminating office equipment. Upon the second closure of the contacts of interrupter 505, relay 423 is released and relay 424 is locked in its operated condition. The operating circuit of relay 500 is now opened and the operating circuit of relay 204 is closed to disconnect the windings of relay 213 from the calling line while it is still short-circuited; to lock itself operated over conductor 427 and the No. 6 contacts of relay 412, under the control of relay 435; to transfer trunk conductors 205 and 206 in preparation for coin collection and to establish the operating circuit for counting relay 418 which thereupon operates. These functions are all performed in the manner previously described.

*Collection of coins deposited for initial period*

With relay 418 operated, coin collecting battery is connected from the source 529, conductor 530, the No. 4 back contacts of relay 435, conductor 536, the No. 5 contacts of relay 518, conductor 531, the No. 1 back contacts of counting relay 417, the No. 4 contacts of relay 418, conductor 431, over the Nos. 1 and 8 back contacts of relay 229, and the Nos. 2 and 8 front contacts of relay 204, thence over the tip and ring conductors of the established connection, through the magnet of coin box 101 to ground over contacts closed thereat by the deposited coin. The coin box magnet is now energized in such a manner as to transfer the previously deposited coin or coins in the coin box till. In the present case the calling party deposited a dime as previously described. Upon the second opening of the contacts associated with cam 505, relay 424 is released and relay 417 is operated in the manner previously described to open the circuit over which coin collecting current was applied to the coin box 101. Upon the third closure of the contacts associated with cam 505, relay 423 again operates and with relay 417 operated the capacity charge of the calling line is dissipated over the tip and ring conductors of the line extended through the operation of relay 204 to the Nos. 1 and 8 back contacts of relay 229 and thence through resistances 230 and 231 and condenser 232 to ground.

Upon the third opening of the contacts of interrupter cam 505, relay 424 operates and upon the fourth closure of the interrupter contacts relay 423 releases, in turn releasing relay 418 in the manner previously described. With relay 200 operated as previously described, and with relay 417 operated and relay 418 released, a circuit for relay W2 is completed extending from battery, resistance 289, winding and normally closed contacts of relay W2, the No. 6 front contacts of relay 200, conductor 237, the No. 3 back contacts of relay 418, the No. 8 front contacts of relay 417, the No. 6 front contacts of relay 401 to ground. With relay W2 operated and relay Z2 released, relay 435 operates in a circuit traced from battery through its winding, conductor 437, lower back contacts of relay Z2, upper front contacts of relay W2, conductors 288 and 287, to ground at the No. 6 contacts of relay 401. Relay 435 locks by way of its No. 2 contacts to conductor 437 as previously described, opens the locking circuit of relay 204 at its No. 1 back contacts, whereupon relay 204 releases to reconnect the windings of relay 213 to the calling line and, at its No. 6 back contacts opens the locking circuit to relay 518 which relay thereupon releases. Upon the fourth opening of the contacts of interrupter 505, relay 424 releases followed by the release of relays 417 and 412. Relay 412 upon releasing discharges condenser 232 through the 1600-ohm resistance 231 and removes the shunt from relay Z2 which now operates. Relay 204 has been operated for an interval of 1.2 to 1.7 seconds during the collection of the deposited coin at station 100.

The charge timer 550 continues its operation until the normal contacts associated with its cam 501 close five minutes after relay 518 operated, at which time a circuit is closed from battery through the winding of overtime relay 528, conductor 532, the No. 5 front contacts of relay 435, conductor 523, closed contacts associated with cam 501, conductor 522, the No. 6 front contacts of relay 435, conductor 245, the left contact of relay 244 to ground over the No. 4 contacts of relay 200 if the conversation still continues, and relay 244 has therefore remained operated. Relay 528, upon operating, at its No. 3 contacts, establishes an obvious operating circuit for relay 590 which relay operates and locks over its No. 2 contacts and conductor 533 to ground over the No. 6 contacts of relay 401; establishes a circuit from battery through the winding of relay 217, over the upper contacts of relay 213, conductor 218, the No. 3 contacts of relay 590, the No. 2 contacts of relay 528, conductor 534, the No. 1 contacts of relay 401, to ground at the back contact of relay 407. Relay 217 operates in this circuit and performs the same functions ascribed to it in a previous description. One such function is to connect battery at its lower contacts to conductor 222 and thence through the winding of trunk preference relay 624, to ground by way of the normally closed lower contacts of relay 625. Another function of relay 217 is to extend the ground at its upper contacts to conductor 299, which upon the functioning of the link L is extended to the charge lead 639 which terminates in terminal 901 of arc T3 of selector switch T, and also to battery through the winding of relay 712. With relay 624 operated and locked, trunk connector relay 626 operates as before to extend the trunk conductors to corresponding conductors of link L. Relay 629 as before causes relays 631 and 634 to operate, the latter combining with the inner contacts of relay 629 to cause relay 635 to operate. The relay 635 performs the same functions previously described which, to repeat, are to extend the link conductors to the pronouncement circuit and to provide locking ground for relay 626. The trunk circuit now proceeds through the cycle previously described for returning any coins which may have been deposited at the same time the ACR circuit is embodied. Thus any coins which have been deposited since the collection of the initial deposit are returned for reinsertion after the request for deposit of charges for the first overtime period.

It is believed unnecessary to repeat in detail, at this time, the operation of the coin request pronouncement circuit which follows the operation of the overtime trunk relay 528. Suffice it to say that the link L, in response to the operation of relays 624, 626 and 635 in the manner previously described, extends the trunk conductors to the coin request pronouncement circuit, and that the telegraphone 720 functions to transmit to the calling subscriber the pronouncement "Please deposit ten cents for five minutes." Also that the timing-out circuit TS functions, as described, to call in a monitoring operator in the event the calling subscriber fails to comply with the request pronouncement within a predetermined interval of time. Also that relay 714 operates in series with relay 407 and then relay 408 operates. When relay 408 operated, it connected the double frequency source 409 to the connection extended to the coin request pronouncement circuit to effect the unlocking of the alternating-current signal receiver ACR.

*Overtime deposit (two nickels)*

It will be assumed that the calling subscriber desires to continue the conversation and accordingly complies with the request pronouncement of telegraphone 720 and makes the required deposit of ten cents for the overtime period.

While the description at this point could be shortened by assuming that the subscriber deposits a dime for the overtime period, it is believed that it will lend to a more complete understanding of the operation of the coin register and adding circuit and associated selector switches AIS and T if it is assumed that the subscriber makes the overtime payment by depositing two nickels instead of a dime.

It will be recalled that when relay 714 operated in series with the trunk relay 407 it connected, at its innermost lower contacts, ground to conductor 735 which resulted in the operation of relay CI1 of the first register in the coin register and adding circuit (Fig. 8). When the first nickel is deposited in the coin box at station 100, frequencies *d* and *f* are generated in the manner described and are transmitted to the now unlocked coin signal receiver ACR to cause the conductors D and F thereof to be grounded. Relay 1100 accordingly operates from the ground on conductor D and, at its armature contacts, extends the ground on conductor F to conductor 840 and thence over the No. 3 front contacts of relay CI1 to battery through the winding of the nickel relay R51. Relay R51 locks operated to ground on conductor 135 by way of its lowermost front contacts, and at its contacts 801 opens the operating circuit for relay CI1 which relay thereupon releases.

Relay CI1 at its No. 1 contacts, opens the J–L circuit to the receiver ACR causing the relays R*d* and R*f* to release in a manner fully described in the aforementioned Patent 2,332,912.

Relay CI2 of the second register now operates in a circuit extending from battery, through its winding, contacts 806, 807, and 808 of the second register relays R252, R102 and R52, respectively, contacts 841 of relay R51, the No. 6 contacts of relay CI1 (released) to ground on conductor 735. The operation of relay CI2 is preparatory to the registering of the second nickel to be deposited by the calling subscriber. At its No. 7 front contacts relay CI2 extends the ground on conductor 800 to conductor 810 and thence over the upper normally closed contacts of relay 736, to battery through the winding of relay 728. Relay 728 operates in this circuit and, at its outermost and middle upper armatures, disconnects the telegraphone from the calling line thereby discontinuing the tariff request pronouncement. Relay 728 locks by way of its lower contacts under control of release relay 713.

When relay R51 operated, it caused relay AI1 to operate in a circuit previously described in connection with the operation of relay R101 during the deposit of a dime for the initial period of conversation. With relays R51 and AI1 operated, a circuit is completed extending from ground at 813, over the No. 7 contacts of relay AI1, upper front contacts of relay R51, the No. 6 contacts of relay AI1, conductor 842, brush of arc AIS2 of switch AIS, terminal 843 thereof, conductor 844, and terminal 845 of arc T2 of totalizing selector T. This ground marks the terminal 845 of arc T2 of the switch T and determines the number of steps to be taken by the switch.

When relay AI1 operated, a circuit for stepping magnet 920 of selector switch T is established as previously described. At its No. 1 front contacts relay AI1 transfers the locking circuit of relay R51 to conductor 819 and thence to ground on conductor 735 by way of the lower back contacts of relay 922, conductor 900, and the No. 3 contacts of relay AI1.

Magnet 920 operates and steps selector T around and its stepping operation continues until the brush of arc T2 encounters the marked terminal 845. Selector T therefore makes one step. Relay 921 then operates over an obvious circuit; opens the operating circuit for stepping magnet 920; and locks to ground on conductor 900 as previously traced. At its lower front contacts relay 921 extends the ground on conductor 900, by way of the upper armature and back contacts of relay 922, to the interrupter contacts and winding of stepping magnet 924. With its operating circuit open, stepping magnet 920 ceases operating and the selector T comes to rest with the brush of arc T2 on terminal 845.

When the selector switch T ceases stepping, the brushes of the several arcs thereof are situated as follows: Brush of arc T1 rests upon terminal 930; brush of arc T2 rests upon terminal 845; brush of arc T3 rests upon terminal 931; and the brush of arc T4 rests upon terminal 932.

It will be observed that the terminal 930 of arc T1 of selector T is strapped to the terminal 933 of arc AIS1 of selector AIS. Thus, under the action of stepping magnet 924, whose operating circuit was completed when relay 921 operated as described, the selector AIS steps its brushes around until the brush of arc AIS1 encounters the terminal 933. When this occurs, relay 922 operates to open the circuit to stepping magnet 924 and thus stop the selector. Relay 922 locks to round on conductor 900 and, at its lower back contact opens the locking circuit for relay R51. Relay R51 thereupon releases causing relay AI1 to release and to remove ground from conductor 900 causing relays 921 and 922 to release.

With the switches AIS and T now set as described, selector T advanced one step as determined by the grounding of the brush of arc AIS2 incident to the operation of the nickel relay R51 in the first register of the coin register and adding circuit, which brush rested upon terminal 843 which is strapped to the terminal 845 of arc T2 of selector switch T. In this position of the selector T, the brush of arc T3 rests upon terminal 931 which is still one terminal removed from terminal 901 which is marked to indicate an overtime charge of ten cents. Relays 820 and 821, therefore, which operate when the amount deposited by the subscriber checks with the amount indicated by the request pronouncement carried by telegraphone 720, do not operate at this time.

The deposit of the second nickel at the calling station may follow quickly upon the deposit of the first nickel but irrespective of whether or not the two coins are deposited in rapid succession or are spaced by a slight time interval, the coin register and adding circuit will function to register the second deposited coin. It will be recalled that relay AI2 of the second register was operated preparatory to the receipt of the signal identifying the deposit of the second nickel. When the second nickel is deposited in the coin box at the calling station the same two frequencies *d* and *f* are generated and transmitted to the alternating-current signal receiver ACR in a manner now apparent to cause the reoperation of relay 1100. With relay 1100 operated, the ground on lead F is again extended to the conductor 840 and thence over the No. 3 front contacts of relay AI2 to battery through the winding of relay R52 which locks as did relay R51, previously described. Relay CI2 then releases to effect the release of the operated relays in the receiver ACR. Relay CI3 then operates to prepare the third register for the receipt of the registration of a third coin, if such is to be deposited.

When relay R52 operated, it caused relay AI2 to operate over a circuit which is now apparent. With relays R52 and AI2 operated, a circuit is completed extending from ground at 813, over the No. 5 front contacts of relay AI2, outer upper front contacts of relay R52, the No. 4 front contacts of relay AI2, to conductor 842 and the brush of arc AIS2 of switch AIS which now stands upon terminal 847 as a consequence of the deposit of the first nickel, and thence over strapping 817 to the terminal 818 of arc T2 of selector switch T. This ground marks the terminal 818 of arc T2 and determines the number of steps the switch T is to take.

Stepping magnet 920 of selector T now operates in a circuit extending from battery, winding and interrupter contacts of magnet 920, lower back contacts of relay 921, conductor 900, the No. 6 front contacts of relay AI2, to ground on conductor 735 as previously traced. At its No. 1 front contacts, relay AI2 transfers the locking circuit of relay R52 to conductor 819 and thence to ground on conductor 735 by way of the lower back contacts of relay 922, conductor 900, and the No. 6 front contacts of relay AI2.

Magnet 920 steps the selector T around until the brush of arc T2 encounters the marked terminal 818. Selector T therefore advances, this time, one step. Relay 921 then operates over an obvious circuit; opens the operating circuit to stepping magnet 920; and locks to ground on conductor 900 as previously traced. At its lower front contacts, relay 921 extends the ground on conductor 900, by way of the upper armature and back contacts of relay 922, to the interrupter contacts and winding of stepping magnet 924. With its operating circuit open, stepping magnet 920 ceases operating and the selector T comes to rest on the marked terminal 818 as described.

When the selector switch T ceases stepping, the brushes of the several arcs thereof are situated as follows: Brush of arc T1 rests upon terminal 923; brush of arc T2 rests upon terminal 901 to which the ten-cent charge lead 639 is connected; and the brush of arc T4 rests upon the terminal 904. It will be noted, at this time, that these brush settings resulting from the deposit of two nickels at the calling station are identical to the settings assumed by the brushes when a dime was deposited at the calling station as previously described.

It will be observed that the terminal 923 of arc T1 of selector T is strapped to the terminal 925 of arc AIS1 of the selector AIS. Thus, under the action of stepping magnet 924, whose operating circuit was completed when relay 921 operated as described, the selector AIS steps its brushes around until the brush of arc AIS1 encounters terminal 925. When this occurs, relay 922 operates to open the circuit of stepping magnet 924 and thus stop the selector. Relay 922 locks to ground on conductor 900 and, at its lower back contacts, opens the locking circuit for relay R52. Relay R52 thereupon releases causing relay AI2 to release. Relay AI2 upon releasing removes ground from conductor 900, causing relays 921 and 922 to release.

When relay AI2 releases, ground on conductor 735 is extended to battery through the winding of relay 830, which relay operates, and, at its lower contacts, connects ground to the lower armature of relay 820, and, at its upper contacts, prepares a locking circuit for relay 821.

When the brush of arc T3 of selector switch T encountered the marked terminal 901, relays 820 and 821 operated over conductor 822, the latter locking under control of relay 830. The switches T and AIS are now restored to normal in the manner previously described and when the brushes of arcs T4 and AIS5 thereof resume their normal positions the ground connected to the lower armature of relay 820 by relay 830 is extended to conductor 825 over conductor 823. Thus the conductor 831, with relay 821 operated, is grounded to effect the operation of release relay 713 in the manner previously described. With relay 713 operated the relays controlled thereby, including relay 714 are released. Relay 714 effects the release of the control relays for link L. Relay 407 in the trunk which operated in series with relay 714, as described, also releases when relay 713 operated.

If the calling subscriber failed to deposit the required overtime charges within a predetermined interval of time and did not abandon the connection the timing-out circuit TS would function in the manner previously described to bring in a monitoring operator on the connection.

*Timing on overtime*

When relay 407 releases as described, it opens at its inner upper front contact the operating circuit for relay 408, which relay then releases. At its No. 6 back contacts relay 408 connects ground to the lowermost front contact of relay 590, which relay is locked operated. The purpose of this ground is to insure the start of the overtime timing cycle only after the overtime deposit has been made by the calling subscriber and such deposit checked. The checking of the overtime deposit with the prescribed toll for such overtime results in the release of the pronouncement circuit and therefore, the release of relay 407, followed by the release of relay 408 as described.

It will be noted that the normal operating circuit for magnet 504 of the charge timer 550 includes conductor 526, the No. 3 back contacts of relay 435, conductor 527, the No. 3 front contacts of charge relay 518 and finds ground at the lower back contacts of relay 590. Obviously, when relay 528 and therefore relay 590 operated to indicate the start of the overtime period, the ground at the lower contacts of relay 590 is removed, and the magnet 504 is deenergized. Thus, the charge timer 550 is stopped and no further timing takes place until relay 408 releases, as above described, to indicate the release of the pronouncement circuit which follows the checking of the coins deposited for the overtime period. With relay 408 released and relay 590 operated the circuit for magnet 504 is completed, finding ground at the No. 6 back contacts of relay 408.

The energization of magnet 504 causes a gear train to engage with a shaft of a telechron motor as previously mentioned. Four and one-half minutes later a circuit is established for relay 412 which may be traced from battery through its winding over conductor 413, the No. 6 back contacts of relay 229, conductor 415, the contacts closed by timer cam 502, to ground over the No. 2 contacts of relay 518. Relay 412 upon operating, connects ground to one contact controlled by the interrupter cam 505, connects the two 50-ohm resistances 514 and 515 across the calling line and removes ground applied over conductor 416 from the line discharge network comprising resistances 230 and 231 and condenser 232 in a manner previously described. Under control of the interrupter 505, counting relay 423 is operated upon the first closure of the interrupter contacts and prepares the operating circuit of counting relay 424 which thereafter operates upon the following opening of the interrupter contacts. With relays 523 and 424 both operated, resistance 515 is short-circuited thus reducing the resistance bridged across the calling line to 50 ohms, and relay 500 is operated to shunt resistance 514 thus further reducing the bridged resistance to zero. The application and reduction of the shunt across the calling line is for the purpose of diverting the current from the line prior to the connection of coin control battery thereto in order to prevent disturbances from reaching the called subscriber through the tandem and terminating office equipment. Upon the second closure of the contacts of interrupter 505, relay 423 is released and relay 424 is locked in its operated condition. The operating circuit of relay 500 is now opened and the operating circuit of relay 204 is closed to disconnect the windings of relay 213 from the calling line while it is still short-circuited; to lock itself operated over conductor 427 and the No. 6 contacts of relay 412, under the control of relay 435; to transfer trunk conductors 205 and 206 in preparation for coin collection and to establish the operating circuit for counting relay 418 which then operates. These functions are performed as described hereinbefore.

*Collection of coins deposited for overtime period*

It is not deemed necessary to describe in detail the circuit operations which take place in effecting the collection of the coins deposited, as described, for the overtime period since to do so would constitute a repetition of the description hereinbefore made under the heading "Collection of Coins Deposited for Initial Period."

It is to be understood that the system of the present invention is so devised that the calling subscriber may maintain the connection for as many overtime periods as desired provided, of course, that each telegraphone pronouncement "Please deposit ten cents" is complied with.

*Disconnection*

If the calling party abandons the connection and the district selector 105 or the district junctor of a cross-bar office releases without waiting for the originating sender to transmit the final heavy positive impulse to operate polarized relay 202, relay 203 will not be operated and therefore the locking circuit for relay 115 will extend as previously traced over conductor 116 and the No. 5 normal contacts of relay 203 to the sleeve conductor 117. When ground is removed from the sleeve conductor 117 at the office selector 106 upon its release following the release of the district selector 105, relay 115 releases followed by the release of relay 112 thus restoring the trunk circuit to normal. The release of the apparatus at the tandem office follows in the usual manner.

If disconnection should occur as the district selector 105 goes through its trunk closure position while awaiting the first telegraphone pronouncement or between the 4½ minute interval and the beginning of the overtime interval and before relay 518 has operated, relay 213 will release. When relay 213 releases, relay 403 releases and a circuit is established from battery through the winding of relay 400, the No. 8 contacts of relay 401 to ground at the back contact of relay 403. Relay 400 upon operating locks over its No. 1 contacts and conductor 438 to ground over the No. 4 contacts of relay 112; at its No. 5 back contacts opens the operating circuit of relay 403 thereby locking in the disconnect condition; at its No. 3 back contacts opens the locking circuit of relay 200 which thereupon releases and establishes the circuit of relay 500 which may be traced from battery through its winding over conductor 516 to ground over the No. 2 contacts of relay 400. Relay 200 upon releasing opens the trunk toward the tandem district selector thereby initiating the release of the connection to the called line; releases relay 244 if operated and releases relay 512. Relay 244, upon releasing, releases relay 434. With relay 500 operated, a circuit is established for operating relay 204 which may be traced from battery through the winding of relay 204 over conductor 234, the No. 4 contacts of relay 400, conductor 427 to ground over the inner upper front contacts of relay 500. Relay 204, upon operating, locks directly to ground over conductor 427 and the front contacts of relay 500; opens the locking circuit of relay 401 at its No. 7 back contacts; establishes a short circuit between trunk conductors 205 and 206 over its Nos. 2 and 8 front contacts and the Nos. 1 and 8 back contacts of relay 229 to block a trunk test on any new call and opens the locking circuit of relay 115 at its No. 4 back contacts whereupon relay 115 releases together with relay 111. Relay 401 upon releasing opens the holding circuit of relay 406 at its No. 6 contacts whereupon relay 406 releases and relay 115 upon releasing releases relay 112 followed by the release of relays 203 and 400. Relay 203 upon releasing removes busy ground from the sleeve conductors 117 and 118 and relay 400 upon releasing releases relay 500 followed by the release of relay 204.

If a disconnection occurs before trunk closure at the district trunk 103, relays 213 and 403 operate on the trunk closure in the sender 104 and relay 403 locks in a circuit from battery through its winding, over the No. 5 back contacts of relay 400, over its own upper contacts, the No. 5 normal contacts of relay 401, conductor 404 to ground over the No. 7 back contacts of relay 204. When relay 401 operates following the operation of relay 403, relay 403 will release if relay 213 is no longer operated or when relay 213 releases if the trunk closure has not ended. From this point the release of the trunk proceeds as just described except that certain relays are not operated and therefore need not be released.

If a disconnection occurs while awaiting the initial coin request pronouncement, the operation is similar to that described except that relay 201 is operated thereby holding the tandem sender from releasing. When relay 400 operates as previously described, relay 201 is released instead of relay 200 and the tandem circuit then proceeds to release immediately.

If a disconnection occurs after relay 200 has operated but before the called subscriber has answered the operation is similar to that described except that relay 435 is not operated.

*Timed release*

If the called subscriber answers the call long enough to cause the operation of relays 244, 434, 512 and 518 as previously described, and then disconnects while the calling line is still in the calling condition, a timing cycle of either one to two minutes or two to four minutes is started. With relays 200 and 201 operated and relay 244 released, relay 534 is operated over a circuit which may be traced from battery through its winding, over the contacts controlled by interrupter cam 511, the inner lower contacts of relay 512, conductor 539, the right contacts of relay 244 to ground over the No. 4 contacts of relay 200; locks over its lower contacts to its operating circuit independent of the contacts of interrupter 511 and closes a circuit from battery through the winding of relay 540, over its upper contacts as soon as the contacts associated with interrupter cam 510 close. With relays 512 and 540 both operated a circuit is established from ground over contacts of relay 540, the middle lower contacts of relay 512, conductor 541, the lower back contacts of relay 207, conductor 441, the back contacts of relay 434 to battery through the winding of relay 400. The trunk then proceeds to release in the manner previously described.

Other circuit features such as those involved with a trunk closure failure and a time alarm need not be described in this application since they are not essential to a complete understanding of the invention. A full description thereof, however, is contained in the aforenoted C. E. Brooks et al. patent.

Figs. 13 and 14 illustrate a standard type of telephone coin collector modified to accommodate the coin signal generator employed in the system embodying the features of the present invention and which is shown schematically at the extreme left of Fig. 1. The metallic housing 1422 supports the coin runways or passages indicated generally at 1423 in any suitable manner as shown, for example, in O. F. Forsberg Patent 1,043,219 of November 5, 1912. The upper ends of the several coin runways or passages project through the top of the metallic housing and terminate in openings 1405, 1410 and 1425 in the plate 1429. These openings are of sizes properly to receive a five-cent coin, a ten-cent coin and a quarter-dollar coin respectively. The coins deposited in these openings traverse the coin runways in well-known manner for ultimate deposit in the coin hopper not shown. The five-cent coin runway is so formed as to cause the coin deposited therein to strike the lower edge only of the bell 1424; the ten-cent coin runway is so designed as to cause the coin deposited therein to strike the bell 1424 at both its upper and lower edges; and the quarter-dollar coin runway is so designed as to cause the coin deposited therein to strike the gong, or signal 1426. The gong 1426 and the bell 1424 are suitably supported by the metallic housing 1422.

Supported between the two side walls of the housing 1422 near the upper extremities thereof is a cross bar, or shelf-like bracket 1406 which carries three units 1407, 1408 and 1409 of a signal generator, each of which consists of a coil and a pair of vibratable reeds. These units are secured to the bracket 1406 by screws, as illustrated, in such positions relative to the upper openings 1411, 1412 and 1413 of the coin runways that the vibratile reeds 1414 project thereacross so as to be engaged by the coins in their passage to the runways. Thus the reeds are caused to vibrate when engaged by the deposited coins and to generate in the coils 1415 (Fig. 1) tone signals of the frequencies hereinbefore referred to in the description of the operation of the over-all system.

What is claimed is:

1. In a telephone system, a subscriber's line, means for extending a call from said line into different tariff zones including a trunk having a terminal appearance identifying each tariff zone, a tariff pronouncement device corresponding to each terminal appearance of said trunk, means for seizing said trunk by way of any of its terminal appearances incident to the initiation of a call over said subscriber's line, and means responsive to the seizure of said trunk by way of one of its terminal appearances for connecting the corresponding tariff pronouncement device to said trunk.

2. In a telephone system, a calling line having a coin box station thereon, a dial at said station, means for extending calls from said calling line into different charge zones comprising a trunk having a terminal appearance for each charge zone, means controlled by said dial in dialing the digits of a called line in a particular charge zone, in originating a call, for seizing said trunk by way of the corresponding terminal appearance, means responsive to the seizure of said trunk by way of a particular terminal appearance for automatically advising the subscriber at the calling station of the charge for the call originated thereat, and means responsive to the deposit of coins at the coin box station in the amount of the charge for the call originated thereat for completing the originated call to the called line.

3. In a telephone system, a calling line having a coin box station thereon, means for extending calls from said calling line into different charge zones comprising a trunk having a terminal appearance for each charge zone, a pronouncement device for each terminal appearance bearing a message indicative of the charge for a call extended over said trunk by way of the corresponding terminal appearance, means at said station for dialing the call digits of a called line in a particular charge zone whereby said trunk is seized by way of the terminal appearance corresponding to the charge zone in which the called line is located, means responsive to the seizure of said trunk by way of the said terminal appearance for connecting the corresponding pronouncement device to the calling line, an operator's position, a signal thereat, means responsive to the deposit of coins at the coin box station in the amount indicated by said pronouncement device for disconnecting said pronouncement device from said calling line, and means controlled by the deposit of coins at the coin box station in an amount other than the charge indicated by the said pronouncement device for operating said signal and for connecting said pronouncement device to said operator's position.

4. In a telephone system, a subscriber's line having a station thereon, means for extending a call from said line into different tariff zones including a trunk having a terminal appearance corresponding to each tariff zone to which said trunk has access, means selectively_controlled over said subscriber's line for seizing said trunk by way of any one of its terminal appearances, a message-bearing telegraphone corresponding to each terminal appearance of said trunk, means effective incident to the seizure of said trunk by way of one of its terminal appearances for automatically connecting the corresponding telegraphone to said trunk whereby the message thereof is transmitted over said trunk for reproduction at the station on said subscriber's line, and means at the station for reproducing the message of the connected telegraphone.

5. In a telephone system, a subscriber's line having a coin box station thereon, a trunk, trunk seizure means, means at said station for operating said trunk seizure means in extending a call over said line, means responsive to the seizure of said trunk for audibly appraising the subscriber at said station of the prescribed tariff rate for such call, means at said station for receiving a deposited coin or coins in the amount of the tariff rate for such call and for identifying the denomination of each coin deposited, means controlled by the identifying means for checking the amount deposited against the prescribed tariff rate for such call, an operator's position, and means effective in the event the amount deposited fails to check with the prescribed tariff rate for directing the call to said operator's position.

6. In a telephone system, a subscriber's line having a coin box station thereon, a trunk, trunk seizure means, means at said station for operating said trunk seizure means incident to the origination of a call at said station, telegraphone means containing a pronouncement as to the prescribed tariff rate for a call extended over said trunk, means effective incident to the seizure of said trunk for connecting said telegraphone means to said subscriber's line, means at said station for receiving deposited coins in the amount of the prescribed tariff rate for such call and for identifying the denomination of each coin deposited, means controlled by the identifying means for checking the amount deposited against the prescribed tariff rate for such call, an operator's position, and means effective in the event the amount deposited fails to check with the prescribed rate for directing the originated call to said operator's position and for connecting said telegraphone means to said position.

7. In a telephone system having a dial, a coin box station, a central office, a trunk having a terminal appearance identifying each of a plurality of different tariff zones to which the trunk has access, means at said station for seizing said trunk by way of one of its terminal appearances incident to the operation of said dial to originate a call at said station, a switch at said central office having terminals corresponding to the terminal appearances of said trunk, means effective incident to the operation of said dial and the consequent seizure of said trunk by way of the said one of its terminal appearances for marking the corresponding terminal of said switch to indicate the prescribed tariff rate for the originated call, means at said station for receiving coins deposited at said station, means controlled by each coin deposited for generating a tone signal characteristic of the denomination of the coin deposited, means including said trunk for transmitting the generated tone signals to said central office, a tone signal receiving circuit responsive to the transmitted tone signals, and means controlled thereby for operating said switch in accordance with the transmitted tone signals whereby said swich is advanced to the marked terminal only if the value of the coins deposited at said station corresponds to the prescribed tariff rate indicated by the marked switch terminal.

8. The telephone system defined in the preceding claim and in which the further extension of the call originated at said station to its intended destination is dependent upon the operation of said switch to its marked terminal.

9. In a telephone system, a coin box station, a central office, a trunk, trunk seizure means, means at said station for operating said trunk seizure means incident to the origination of a call at said station, a switch at said central office, means effective incident to the seizure of said trunk for marking a terminal of said switch to indicate the prescribed tariff rate for the originated call, means at said station for receiving coins deposited at said station, means controlled by each coin deposited for generating a tone signal characteristic of each denomination of the coin deposited, means including said trunk for transmitting the generated tone signals to said central office, a tone signal receiving circuit responsive to the transmitted tone signals, an operator's position at said central office, means controlled by said tone signal receiving circuit for operating said switch in accordance with the transmitted tone signals, and means responsive to the operation of said switch to a terminal other than the marked terminal thereof for directing the originated call to said operator's position.

10. In a telephone system, a first office, a coin box line terminating therein, a tandem office, terminating offices, switching mechanism in said offices, control means in said tandem office, an operator's position in said first office, a trunk extending between said first and said tandem offices having a separate appearance in the switching mechanism of said first office and a corresponding tariff request pronouncement device for each of a plurality of charge rates for calls from said line to desired lines terminating in said terminating offices, trunk seizure means, means controlled by said trunk seizure means to prepare said control means for controlling the completion of the desired connection and for connecting a pronouncement device corresponding to the charge rate for the desired connection to said trunk whereby a request for coins in the amount of the prescribed tariff rate for the desired connection is automatically transmitted over the coin box line, means for automatically checking the deposit of the coins against the prescribed tariff rate, means operated only if the value of the deposited coins checks with the prescribed tariff rate for signaling said control means to proceed with the completion of the desired connection, and means operated only if the value of the deposited coins does not check with the prescribed tariff rate for diverting the connection to said operator's position.

11. In a telephone system, a first office, a coin box line terminating therein, a tandem office, terminating offices, control means in said tandem office, an operator's position in said first office, a trunk extending between said first and said tandem offices having a separate appearance in the switching mechanism of said first office and a corresponding tariff request pronouncement device for each of a plurality of charge rates for calls from said line to desired lines terminating in said terminating offices, trunk seizure means, means controlled by said trunk seizure means to prepare said control means for controlling the completion of the desired connection and for connecting a pronouncement device corresponding to the charge rate for the desired connection to said trunk whereby a request for coins in the amount of the prescribed tariff rate for the desired connection is automatically transmitted over the coin box line, means for automatically checking the deposit of the coins against the prescribed tariff rate, means operated only if the value of the deposited coins checks with the prescribed tariff rate for signaling said control means to proceed with the completion of the desired connection, and means operated if the value of the deposited coins fails to check with the prescribed tariff rate for diverting the connection to said operator's position and for connecting the said corresponding tariff request pronouncement device to said operator's position.

12. In a telephone system, a central office, a telephone line having a coin box station thereon, a trunk circuit having a plurality of terminal appearances each identifying a different tariff zone accessible to said trunk and by way of which said trunk may be selectively seized incident to the origination of a call at said station, a plurality of telegraphones at said central office each corresponding to a different one of the terminal appearances of said trunk circuit, means controlled from said station for seizing said trunk circuit selectively by way of any one of its terminal appearances, and means responsive to the seizure of said trunk circuit by way of one of its terminal appearances for connecting the corresponding telegraphone to said trunk circuit.

13. In a telephone system, a central office, a telephone line having a coin box station thereon, a trunk circuit, a telegraphone at said central office carrying a pronouncement indicative of the cost of a call extended from said coin box station over said trunk circuit, means responsive to the seizure of said trunk incident to the origination of a call at said coin box station for connecting said telegraphone to said trunk, coin receiving means at said station, means responsive to the deposit of coins in said coin receiving means in the amount indicated by said telegraphone for completing the originated call to a called station and for disconnecting said telegraphone from said trunk circuit, means effective incident to a response at the called station for initiating a timed interval, and means effective at the termination of the timed interval for reconnecting said telegraphone to said trunk circuit.

14. In a telephone system, a central office, a telephone line having a coin box station thereon, means at said station for generating tone signals distinctively characteristic of the denomination of each coin deposited at said coin box station, means at said central office for detecting the generated tone signals and evaluating them in accordance with the coin denominations characterized thereby, means at the central office for totalizing the evaluated tone signals and for checking the total against the prescribed tariff rate for a call originated at said station, an operator's position at the central office, a tariff request pronouncement device at the central office, and means controlled by said totalizing and checking means for connecting said tariff request pronouncement device to said operator's position when said totalizing and checking means indicate a total which is at variance with the prescribed tariff rate for the call originated at said station.

15. In a telephone system, a central office, a telephone line having a coin box station thereon, a trunk, means at said station for effecting the seizure of said trunk in extending a call over said line, a tariff request pronouncement device at said central office, means effective incident to the seizure of said trunk for connecting said tariff request pronouncement device to said telephone line by way of said trunk to audibly apprise the subscriber at said station of the prescribed tariff rate for the call originated thereat, means at said station for receiving deposited coins in the amount of the tariff rate for such call, timing means, means effective incident to the connection of said tariff request pronouncement device to said line for initiating a timing interval under control of said timing means, an operator's position at said central office, a signal device at said operator's position, and means controlled by said timing means for completing an operating circuit to said signal device at the end of the initiated timing interval.

16. In a telephone system, a subscriber's line, means for extending a call from said line into different tariff zones including a trunk having a terminal appearance identifying each tariff zone, a tariff pronouncement device corresponding to each terminal appearance of said trunk, means for seizing said trunk by way of any of its terminal appearances, and means for connecting the corresponding tariff pronouncement device to said trunk.

17. In a telephone system, a calling line having a coin box station thereon, a dial at said station, means for extending calls from said calling line into different charge zones comprising a trunk having a terminal appearance for each charge zone, means for causing the seizure of said trunk by way of a particular terminal appearance, means whereby said last-mentioned means is controlled by said dial when operated to dial the digits of a called line in the charge zone corresponding to the said terminal appearance, means for automatically advising the subscriber at the calling station of the charge for the call originated thereat, means whereby said last-mentioned means responds to the seizure of said trunk by way of the said particular terminal appearance, means for completing the originated call to the called line, and means whereby said last-mentioned means responds to the deposit of coins at said station in the amount of the charge for the call originated thereat.

18. In a telephone system, a subscriber's line having a coin box station thereon, a trunk, trunk seizure means, means at said station for operating said trunk seizure means, means for audibly appraising the subscriber at said station of the prescribed tariff rate for such call, means whereby said last-mentioned means responds to the seizure of said trunk, means at said station for receiving a deposited coin or coins in the amount of the tariff rate for such call and for identifying the denomination of each coin deposited, means for checking the amount deposited against the prescribed tariff rate for such call, means whereby said last-mentioned means is controlled by said identifying means, an operator's position, means for directing the call to said operator's position, and means whereby said last-mentioned means operates in the event the amount deposited fails to check with the prescribed tariff rate.

19. In a telephone system, a central office, a telephone line having a coin box station thereon, a trunk circuit having a plurality of terminal appearances each identifying a different tariff zone accessible to said trunk and by way of which said trunk may be selectively seized, means whereby said last-mentioned means operates in response to the origination of a call at said station, a plurality of telegraphones at said central office each corresponding to a different one of the terminal appearances of said trunk circuit, means at said station for effecting the seizure of said trunk circuit selectively by way of any one of its terminal appearances, means for connecting a telegraphone corresponding to one of the said trunk terminal appearances to said trunk circuit, and means whereby said last-mentioned means operates in response to the seizure of the trunk circuit by way of the trunk terminal appearance corresponding to the connected telegraphone.

References Cited in the file of this patent

UNITED STATES PATENTS

| Number | Name | Date |
|---|---|---|
| 2,000,804 | Wehren | Aug. 7, 1935 |
| 2,020,466 | Hatton et al. | Nov. 12, 1935 |
| 2,224,702 | Seidel | Dec. 10, 1940 |
| 2,298,453 | Boscom | Oct. 13, 1942 |

FOREIGN PATENTS

| Number | Country | Date |
|---|---|---|
| 417,524 | Great Britain | Oct. 8, 1934 |
| 604,547 | Great Britain | July 6, 1948 |